United States Patent
Saito et al.

(10) Patent No.: US 11,827,984 B2
(45) Date of Patent: Nov. 28, 2023

(54) COATED STEEL PRODUCT

(71) Applicant: NIPPON STEEL CORPORATION, Tokyo (JP)

(72) Inventors: Mamoru Saito, Tokyo (JP); Yasuto Goto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/249,382

(22) PCT Filed: Sep. 29, 2021

(86) PCT No.: PCT/JP2021/036005
§ 371 (c)(1),
(2) Date: Apr. 18, 2023

(87) PCT Pub. No.: WO2022/085386
PCT Pub. Date: Apr. 28, 2022

(65) Prior Publication Data
US 2023/0323521 A1      Oct. 12, 2023

(30) Foreign Application Priority Data
Oct. 21, 2020  (JP) ................................. 2020-176669

(51) Int. Cl.
*C23C 2/06* (2006.01)
*C23C 2/28* (2006.01)
(Continued)

(52) U.S. Cl.
CPC ............... *C23C 2/06* (2013.01); *B32B 15/01* (2013.01); *B32B 15/012* (2013.01);
(Continued)

(58) Field of Classification Search
CPC ..... C23C 30/00; C23C 30/005; C23C 28/025; C23C 28/023; C23C 28/3225; C23C 2/06;
(Continued)

(56) References Cited

U.S. PATENT DOCUMENTS

2005/0123786 A1*  6/2005  Honda ....................... C23C 2/12
                                                                                      428/650
2014/0127531 A1*  5/2014  Yasui ....................... B32B 15/01
                                                                                      428/659

FOREIGN PATENT DOCUMENTS

JP    2001-207249 A    7/2001

* cited by examiner

*Primary Examiner* — Michael E. La Villa
(74) *Attorney, Agent, or Firm* — SOLARIS Intellectual Property Group, PLLC

(57) ABSTRACT

A coated steel product including a base steel, and a coating layer containing a Zn—Al—Mg alloy layer disposed on a surface of the base steel, in which the coating layer has a predetermined chemical composition, the coated steel product including dendrite-shaped $MgZn_2$ phase having a surface roughness Sa of 50 nm or less on a surface of the Zn—Al—Mg alloy layer, an area ratio of the dendrite-shaped $MgZn_2$ phase having a surface roughness Sa of 50 nm or less being from 30% to 80% within a region of an observable field of view of 5 $mm^2$, and among the dendrite-shaped $MgZn_2$ phase having a surface roughness Sa of 50 nm or less, a number of dendrite-shaped $MgZn_2$ phase having an area of 0.1 $mm^2$ or more being from 5 to 100 within a region of an observable field of view of 25 $mm^2$.

2 Claims, 3 Drawing Sheets

(51) Int. Cl.
 C22C 18/04 (2006.01)
 B32B 15/01 (2006.01)
 C23C 28/02 (2006.01)
 B32B 15/18 (2006.01)
 C23C 28/00 (2006.01)
 C23C 2/12 (2006.01)
 B32B 15/04 (2006.01)
 C23C 2/40 (2006.01)
 C23C 30/00 (2006.01)
 C22C 18/00 (2006.01)
(52) U.S. Cl.
 CPC ............ *B32B 15/013* (2013.01); *B32B 15/04* (2013.01); *B32B 15/043* (2013.01); *B32B 15/18* (2013.01); *C22C 18/00* (2013.01); *C22C 18/04* (2013.01); *C23C 2/12* (2013.01); *C23C 2/28* (2013.01); *C23C 2/29* (2022.08); *C23C 2/40* (2013.01); *C23C 28/023* (2013.01); *C23C 28/025* (2013.01); *C23C 28/3225* (2013.01); *C23C 30/00* (2013.01); *C23C 30/005* (2013.01); *Y10T 428/12757* (2015.01); *Y10T 428/12792* (2015.01); *Y10T 428/12799* (2015.01); *Y10T 428/12951* (2015.01); *Y10T 428/12958* (2015.01); *Y10T 428/12972* (2015.01); *Y10T 428/12993* (2015.01)

(58) Field of Classification Search
 CPC .... C23C 2/29; C23C 2/28; C23C 2/12; C23C 2/40; C22C 18/00; C22C 18/04; B32B 15/01; B32B 15/012; B32B 15/013; B32B 15/04; B32B 15/043; B32B 15/18; Y10T 428/12757; Y10T 428/12792; Y10T 428/12799; Y10T 428/12951; Y10T 428/12958; Y10T 428/12972; Y10T 428/12993
 See application file for complete search history.

COATED STEEL PRODUCT

TECHNICAL FIELD

The present disclosure relates to a coated steel product.

BACKGROUND ART

In recent years, there is a need for using various base steels (steel products to be coated) in coated steel products. For example, cases are presumed in which steel products (high tensile strength steel products, hot-rolled steel sheet products, and the like) whose base irons contain a large amount of alloy elements and which have various surface properties are used as the base steels.

However, it is a challenge in coated steel products for many years to always provide coated steel products having the same appearance without depending on the properties of the base steels.

In order to impart a uniform appearance to the coated steel product, a spangle is often provided. Providing a spangle is a technique often used in practice in Al—Zn-based coated steel sheets for imparting a special appearance to the coated steel product.

For example, a Zn-55% Al-1.6% Si-coated steel product (hereinafter, also referred to as "GALVALUME steel product") widely penetrating the market is an Al—Zn-based coated steel product, and a uniform appearance is formed by providing a spangle. Thus, with respect to scratches or the like generated on the surface of the coating layer during manufacture and controlled transportation, there is an effect of rendering the scratches or the like inconspicuous.

In the Al—Zn-based coated steel product, the spangle is formed for the first time when the Al phase is coarsely grown in the coating layer in a state where the Al concentration is sufficiently high.

In addition to the GALVALUME steel product, a Zn-coated steel product (hot-dip galvanized steel product, Zn-coated steel product for ducts, and the like) may also be provided with a spangle.

The Zn-based coated steel product is formed for the first time when the Zn phase is coarsely grown in the coating layer in a state where the Zn concentration is sufficiently high.

For example, Patent Document 1 discloses a technique for forming a spangle on a coated steel product by growing a single phase of pure metal such as an Al phase or a Zn phase.

Patent Document 1: Japanese Patent Application Laid-Open (JP-A) No. 2001-207249

SUMMARY OF INVENTION

Technical Problem

The GALVALUME steel product is excellent in corrosion resistance on flat surface, and has a beautiful spangle appearance on the surface of the coating layer, and thus is suitable for construction product applications and the like in which designability is emphasized. However, the GALVALUME steel product has a high Al concentration in the coating layer and poor sacrificial corrosion protection ability. Thus, the end face of the GALVALUME steel product needs to be repaired, and the cost is added.

On the other hand, in general, a coated steel product having a multi-element-based coating layer containing at least Zn, Al, and Mg has a low Al concentration in the coating layer and exhibits high sacrificial corrosion protection ability. However, an Al phase cannot occupy a sufficient volume in the coating layer, and it is difficult to provide a spangle itself on the surface of the coating layer.

It is therefore an object of the disclosure to provide a coated steel product having excellent corrosion resistance on flat surface and sacrificial corrosion protection ability while having a beautiful spangle appearance. Solution to Problem The above object is achieved by the following means. That is,

<1>

A coated steel product including a base steel, and a coating layer containing a Zn—Al—Mg alloy layer disposed on a surface of the base steel, in which the coating layer has a chemical composition containing, in % by mass:

Zn: greater than 65.0%,
Al: from greater than 5.0% to less than 25.0%,
Mg: from greater than 3.0% to less than 12.5%,
Sn: from 0% to 3.00%,
Bi: from 0% to less than 5.0%,
In: from 0% to less than 2.0%,
Ca: from 0% to 3.0%,
Y: from 0% to 0.5%,
La: from 0% to less than 0.5%,
Ce: from 0% to less than 0.5%,
Si: from 0% to less than 2.5%,
Cr: from 0% to 0.25%,
Ti: from 0% to 0.25%,
Ni: from 0% to 0.25%,
Co: from 0% to 0.25%,
V: from 0% to 0.25%,
Nb: from 0% to 0.25%,
Cu: from 0% to 0.25%,
Mn: from 0% to 0.25%,
Fe: from 0% to 5.0%,
Sr: from 0% to less than 0.5%,
Sb: from 0% to less than 0.5%,
Pb: from 0% to less than 0.5%,
B: from 0% to less than 0.5%, and
impurities, the coated steel product including dendrite-shaped $MgZn_2$ phase having a surface roughness Sa of 50 nm or less on a surface of the Zn—Al—Mg alloy layer, an area ratio of the dendrite-shaped $MgZn_2$ phase having a surface roughness Sa of 50 nm or less being from 30% to 80% within a region of an observable field of view of 5 $mm^2$, and among the dendrite-shaped $MgZn_2$ phase having a surface roughness Sa of 50 nm or less, a number of dendrite-shaped $MgZn_2$ phase having an area of 0.1 $mm^2$ or more being from 5 to 100 within a region of an observable field of view of 25 $mm^2$.

<2>

The coated steel product according to <1>, in which a content of Sn in the coating layer is from 0.05% to 3.00%, by mass %.

Advantageous Effects of Invention

According to the disclosure, it is possible to provide a coated steel product having excellent corrosion resistance on flat surface and sacrificial corrosion protection ability while having a beautiful spangle appearance.

DESCRIPTION OF EMBODIMENTS

Figure 1:
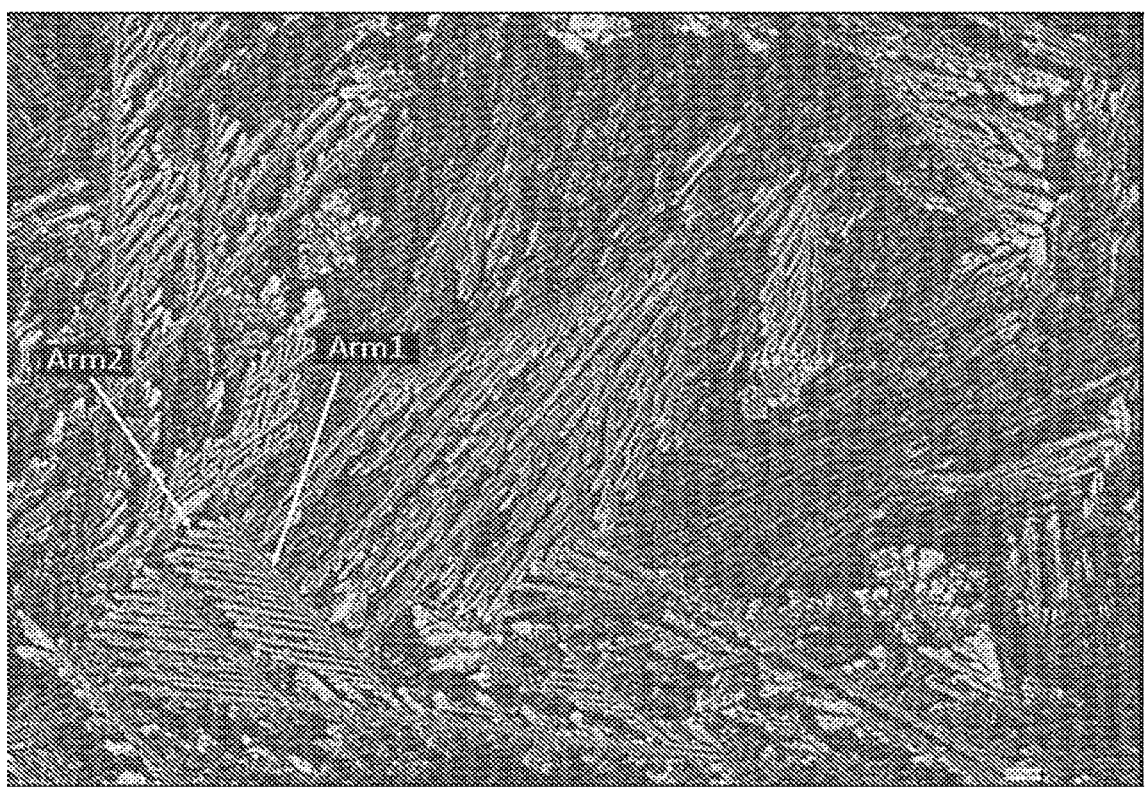
FIG. 1 is an optical micrograph (magnification: 5×) showing an example of the surface of the Zn—Al—Mg alloy layer of a coated steel product of the disclosure.

An example of the disclosure will be described hereinafter.

In the disclosure, the expression "%" with respect to the content of each element of a chemical composition means "% by mass".

Numerical ranges expressed by using "to" mean ranges in which the numerical values described before and after the "to" are included as the lower limit and the upper limit.

Numerical ranges in cases in which "greater than" or "less than" accompanies a numerical value before or after the "to" mean ranges that do not include the value as the lower limit or the upper limit.

The content of an element in a chemical composition may be expressed as an element concentration (for example, Zn concentration and Mg concentration).

The term "step" includes not only an independent step but also a step that cannot be clearly distinguished from other steps as long as the intended purpose of the step is achieved.

"corrosion resistance on flat surface" refers to a corrosion resistant property of a coating layer (specifically, Zn—Al—Mg alloy layer) itself "Sacrificial corrosion protection ability" refers to a property of suppressing corrosion of a base steel at an exposed portion of the base steel (for example, a cut edge of a coated steel product, a cracked portion of a coating layer generated at the time of processing, and a portion where the base steel is exposed due to peeling of a coating layer).

"Spangle" is a pattern that has a certain degree of metallic luster and in which a visually recognizable geometric pattern is repeated iteratively.

"Cross section of a layer" refers to a cross section obtained by cutting the layer along the thickness direction.

"Surface of a layer" refers to a surface facing the thickness direction of the layer and facing the outside of a coated steel product.

The coated steel product of the disclosure is a coated steel product including a base steel and a coating layer that is disposed on the surface of the base steel and includes a Zn—Al—Mg alloy layer.

In the coated steel product of the disclosure, the coating layer has a predetermined chemical composition.

The coated steel product of the disclosure includes dendrite-shaped $MgZn_2$ phase having a surface roughness Sa of 50 nm or less on the surface of the Zn—Al—Mg alloy layer, the area ratio of the dendrite-shaped $MgZn_2$ phase having a surface roughness Sa of 50 nm or less is from 30% to 80% within a region of an observable field of view of 5 mm$^2$, and among the dendrite-shaped $MgZn_2$ phase having a surface roughness Sa of 50 nm or less, the number of dendrite-shaped $MgZn_2$ phase having the area of 0.1 mm$^2$ or more (hereinafter, the dendrite-shaped $MgZn_2$ phase having an area of 0.1 mm$^2$ or more is also referred to as "coarse dendrite-shaped $MgZn_2$ phase") is from 5 to 100 within a region of an observable field of view of 25 mm$^2$.

Owing to the above-described configuration, the coated steel product product of the disclosure is a coated steel product having excellent corrosion resistance on flat surface and sacrificial corrosion protection ability while having a beautiful spangle appearance. The coated steel product of the disclosure has been discovered from the following findings.

The inventors have studied spangle pattern formation on a Zn—Al—Mg alloy layer having high corrosion resistance on flat surface and sacrificial corrosion protection ability. As a result, the following findings have been obtained.

When the $MgZn_2$ phase has low roughness (surface roughness Sa of 50 nm or less), the phase has high regular reflectance and low diffuse reflectance as compared with a surrounding structure having high roughness (surface roughness Sa of about from 100 to 300 nm). The $MgZn_2$ phase having a high regular reflectance looks white, whereas the structure having a low regular reflectance and a high diffuse reflectance looks black (see FIG. 1 and FIG. 2).

Thus, a beautiful spangle pattern is formed in a case in which $MgZn_2$ phase are developed in coarse dendrite shapes in a Zn—Al—Mg alloy layer having high corrosion resistance on flat surface and sacrificial corrosion protection ability, and a predetermined amount of dendrite-shaped $MgZn_2$ phase having a surface roughness Sa of 50 nm or less and a large number of coarse dendrite-shaped $MgZn_2$ phase having a surface roughness Sa of 50 nm or less are present on the surface of the Zn—Al—Mg alloy layer.

A spangle pattern in a hot-dip galvanized layer, a post-coating layer, or the like is usually formed due to crystal grains of Zn, but in the disclosure, a spangle pattern in the Zn—Al—Mg alloy layer is formed due to a difference in color arising from a difference in light reflectance of the $MgZn_2$ phase as described above.

From the above, it has been found that the coated steel product of the disclosure is a coated steel product having excellent corrosion resistance on flat surface and sacrificial corrosion protection ability while having a beautiful spangle appearance owing to the above-described configuration.

Since the coated steel product of the disclosure is excellent in sacrificial corrosion protection ability, cost reduction due to omission of end face repair can also be realized.

Details of the coated steel product of the disclosure will be described hereinafter.

Base Steel

A base steel to be coated will be described.

The shape of the base steel is not particularly limited. Examples of the base steel include, in addition to steel sheets, shape processed base steels such as steel pipes, civil engineering and construction product s (fence conduits, corrugated pipes, drain ditch covers, wind-blown sand preventing plates, bolts, wire mesh, guardrails, cut-off walls, and the like), electrical home appliance members (housings of outdoor units of air conditioners and the like), and automotive parts (undercarriage members and the like). Various plastic working methods such as press working, roll forming, and bending can be used as shape processing.

The product of the base steel is not particularly limited. For example, various base steels such as general steels, pre-coated steels, Al-killed steels, ultra-low carbon steels, high carbon steels, various high tensile strength steels, and some high alloy steels (for example, steels containing a strengthening element such as Ni or Cr) can be used as the base steel.

With respect to the base steels, conditions of methods of manufacturing the base steels, methods of manufacturing base steel sheets (hot rolling method, pickling method, cold rolling method, and the like), and the like are not particularly limited.

Hot-rolled steel sheets, hot-rolled steel strips, cold-rolled steel sheets, and cold-rolled steel strips described in JIS G 3302 (2010) can also be used as the base steel.

The base steel may be one that has been pre-coated, that is, a pre-coated steel product. The pre-coated steel product is obtained by, for example, an electrolytic treatment method or a displacement coating method. In the electrolytic treatment method, a pre-coated steel product is obtained by immersing a base steel in a sulfate bath or a chloride bath that contains metal ions of various pre-coating components and carrying out an electrolytic treatment. In the displacement coating method, a pre-coated steel product is obtained by immersing a base steel in an aqueous solution that contains metal ions of various pre-coating components and whose pH is adjusted with sulfuric acid, and effecting displacement precipitation of the metals.

A Ni pre-coated steel product is a representative example of a pre-coated steel product.

Coating Layer

Next, the coating layer will be described.

The coating layer includes a Zn—Al—Mg alloy layer. The coating layer may include an Al—Fe alloy layer in addition to the Zn—Al—Mg alloy layer. The Al—Fe alloy layer exists between the base steel and the Zn—Al—Mg alloy layer.

That is, the coating layer may have a single-layer structure of a Zn—Al—Mg alloy layer or a multilayer structure including a Zn—Al—Mg alloy layer and an Al—Fe alloy layer. In the case of the multilayer structure, the Zn—Al—Mg alloy layer is preferably a layer constituting the surface of the coating layer.

However, although an oxide film of an element constituting the coating layer may be formed to about 50 nm on the surface of the coating layer, the oxide film is thin with respect to the thickness of the entire coating layer and considered not to constitute the main part of the coating layer.

The deposited amount of the coating layer is preferably from 20 to 300 $g/m^2$ on one surface.

When the deposited amount of the coating layer is 20 $g/m^2$ or more, the corrosion resistance on flat surface and the sacrificial corrosion protection ability can be ensured reliably. When the deposited amount of the coating layer is 300 $g/m^2$ or less, appearance defects such as sagging patterns of the coating layer can be suppressed.

Here, the thickness of the Zn—Al—Mg alloy layer is, for example, from 2 μm to 95 μm (preferably from μm to 75 μm).

On the other hand, the thickness of the entire coating layer is, for example, about 100 μm or less. Since the thickness of the entire coating layer depends on coating conditions, the upper limit and the lower limit of the thickness of the entire coating layer are not particularly limited. For example, the thickness of the entire coating layer is related to the viscosity and specific gravity of the coating bath in the case of a usual hot-dip coating method. Moreover, the amount of the coating is quantitatively adjusted by the drawing speed of the base steel and the intensity of the wiping. Thus, the lower limit of the thickness of the entire coating layer may be considered to be about 2 μm.

On the other hand, the upper limit of the thickness of the coating layer that can be produced by a hot-dip coating method is about 95 μm due to the own weight and uniformity of the coating metal.

Since the thickness of the coating layer can be freely changed depending on the drawing speed from the coating bath and the wiping conditions, it is not particularly difficult to manufacture a coating layer having a thickness of from 2 to 95 μm.

The thickness of the Al—Fe alloy layer is, for example, from 0 μm to 5 μm.

That is, the Al—Fe alloy layer need not be formed. The thickness of the Al—Fe alloy layer is preferably from 0.05 μm to 5 μm from the viewpoints of increasing the adhesion of the coating layer (specifically, Zn—Al—Mg alloy layer) and ensuring the processability.

However, in general, when a coating layer having a chemical composition specified in the disclosure is formed by a hot-dip coating method, an Al—Fe alloy layer of 100 nm or more is often formed between the base steel and the Zn—Al—Mg alloy layer. The lower limit of the thickness of the Al—Fe alloy layer is not particularly limited, and it is known that an Al—Fe alloy layer is inevitably formed at the time of forming a hot-dip coating layer containing Al. Empirically, the thickness around 100 nm is the thickness that is obtained when the formation of the Al—Fe alloy layer is suppressed the most, and is considered to be the thickness that sufficiently ensures the adhesion between the coating layer and the base steel. In the hot-dip coating method, it is difficult to form an Al—Fe alloy layer thinner than 100 nm because the Al concentration is high unless special measures are taken. However, even when the thickness of the Al—Fe alloy layer is less than 100 nm, or even when the Al—Fe alloy layer is not formed, it is presumed that the coating performance is not significantly affected.

On the other hand, when the thickness of the Al—Fe alloy layer is greater than 5 μm, the Al component of the Zn—Al—Mg alloy layer formed on the Al—Fe alloy layer is insufficient, and moreover, the adhesion and the processability of the coating layer tend to extremely deteriorate. Thus, the thickness of the Al—Fe alloy layer is preferably limited to 5 μm or less.

The Al—Fe alloy layer is also closely related to the Al concentration and the Sn concentration, and in general, the growth rate tends to increase as the Al concentration and the Sn concentration are higher.

The thicknesses of the Zn—Al—Mg alloy layer and the Al—Fe alloy layer are measured as follows.

The thickness is measured at five arbitrary positions of the identified Al—Fe alloy layer in an SEM backscattered electron image (magnification: 5000×, view field size: 50 μm width×200 μm length, provided that an Al—Fe alloy layer is visible in the view field) of a cross section of a coating layer (a cross section cut along the thickness direction of the coating layer) prepared by embedding a sample in a resin and then grinding. The arithmetic average of the five positions is defined as the thickness of the interfacial alloy layer.

—Al—Fe alloy layer

Next, the Al—Fe alloy layer will be described.

The Al—Fe alloy layer may be formed on the surface of the base steel (specifically, between the base steel and the Zn—Al—Mg alloy layer), and is a layer having a structure in which an $Al_5Fe$ phase is the main phase. The Al—Fe alloy layer is formed by mutual atomic diffusion between the base steel and the coating bath. In the coating layer containing the Al element, the Al—Fe alloy layer is easily formed. Since Al is contained in the coating bath at a certain concentration or more, the $Al_5Fe$ phase is a phase that is formed the most. However, the atomic diffusion takes time, and there is a portion where the Fe concentration is high in the vicinity of the base steel. Thus, the Al—Fe alloy layer may partially contain a small amount of an AlFe phase, an Al$_3$Fe phase, an Al$_5$Fe$_2$ phase, or the like. In addition, since the coating bath also contains Zn at a certain concentration, the Al—Fe alloy layer also contains a small amount of Zn.

With regard to the corrosion resistance, there is no significant difference in any of the Al$_5$Fe phase, the Al$_3$Fe phase, the AlFe phase, and the Al$_5$Fe$_2$ phase. "Corrosion resistance" referred to herein is corrosion resistance at a portion that is not affected by welding.

Here, in a case in which Si is contained in the coating layer, the Si is particularly easily incorporated into the Al—Fe alloy layer, and an Al—Fe—Si intermetallic compound phase may be formed. Examples of the intermetallic compound phase to be identified include AlFeSi phase, and α, β, q1, q2-AlFeSi phase and the like exist as isomers. Thus, these AlFeSi phase and the like may be detected in the Al—Fe alloy layer. Such an Al—Fe alloy layer including these AlFeSi phase and the like is also referred to as an Al—Fe—Si alloy layer.

Since the thickness of the Al—Fe—Si alloy layer is also small relative to the Zn—Al—Mg alloy layer, the influence on the corrosion resistance of the entire coating layer is small.

In a case in which any of various pre-coated steel product s is used as a base steel (such as a base steel sheet), the structure of the Al—Fe alloy layer may change depending on the deposited amount of the pre-coating. Specifically, there are a case in which a pure metal layer used for pre-coating remains around the Al—Fe alloy layer, a case in which an intermetallic compound phase (for example, an Al$_3$Ni phase) in which a constituent component of the Zn—Al—Mg alloy layer and a pre-coating component are bonded forms an alloy layer, a case in which an Al—Fe alloy layer in which some Al atoms and Fe atoms are replaced with other atoms is formed, a case in which an Al—Fe—Si alloy layer in which some Al atoms, Fe atoms, and Si atoms are replaced with other atoms is formed, and the like. In all of the cases, since the thicknesses of these alloy layers are small relative to the Zn—Al—Mg alloy layer, the influence on the corrosion resistance of the entire coating layer is small.

That is, the Al—Fe alloy layer is a layer that encompasses the above-described various modes of alloy layers in addition to the alloy layer mainly composed of the Al$_5$Fe$_2$ phase.

In a case in which the coating layer is formed on a Ni pre-coated steel product among various pre-coated steel product s, an Al—Ni—Fe alloy layer is formed as the Al—Fe alloy layer. Since the thickness of the Al—Ni—Fe alloy layer is also small relative to the Zn—Al—Mg alloy layer, the influence on the corrosion resistance of the entire coating layer is small.

Since the Al—Fe alloy layer often has an Al$_5$Fe phase as the main constituent, a composition containing Fe: from 25 to 35%, Al: from 65 to 75%, Zn: 5% or less, and the balance: impurities, can be given as an example of the chemical composition of the Al—Fe alloy layer.

Usually, since the thickness of a Zn—Al—Mg alloy layer is larger than that of an Al—Fe alloy layer, contribution of the Al—Fe alloy layer as a coated steel product to corrosion resistance on flat surface is smaller than that of a Zn—Al—Mg alloy layer. However, the Al—Fe alloy layer contains Al and Zn, which are corrosion-resistant elements, at certain concentrations or more as inferred from the result of the component analysis. Thus, the Al—Fe alloy layer has a certain degree of sacrificial corrosion protection ability and corrosion barrier effect for the base steel.

Here, it is difficult to confirm the contribution of a thin Al—Fe alloy layer alone to the corrosion resistance by quantitative measurement. However, for example, in a case in which the Al—Fe alloy layer has a sufficient thickness, the Zn—Al—Mg alloy layer on the Al—Fe alloy layer is precisely removed by cutting such as endmilling from the surface of the coating layer, and then a corrosion test is performed, whereby the corrosion resistance of the Al—Fe alloy layer alone can be evaluated. Since an Al—Fe alloy layer contains an Al component and a small amount of a Zn component, when there is an Al—Fe alloy layer, only dot-like red rust is formed. Unlike cases in which there is no Al—Fe alloy layer and the base steel is exposed, red rust spreading over the entire surface does not appear.

During a corrosion test, when a section of the coating layer which has reached a stage immediately before red rust formation on the base steel is observed, it can be confirmed that even when the Zn—Al—Mg alloy layer as the upper layer is dissolved and rusted, only the Al—Fe alloy layer remains and prevents corrosion of the base steel. This is because the Al—Fe alloy layer is electrochemically nobler than the Zn—Al—Mg layer, but less noble than the base steel. From these facts, it can be judged that the Al—Fe alloy layer also has certain corrosion resistance.

From the viewpoint of corrosion, the thicker the Al—Fe alloy layer, the more preferable it is and the more effective for delaying the time of red rust formation it is. Thus, the thickness of the Al—Fe alloy layer is preferably 0.05 μm or more. However, since a thick Al—Fe alloy layer is a cause of significant deterioration of the coating processability, the thickness is preferably equal to or less than a certain thickness. From the viewpoint of processability, the thickness of the Al—Fe alloy layer is preferably 5 μm or less. When the thickness of the Al—Fe alloy layer is 5 μm or less, cracks generated from the coated Al—Fe alloy layer as a starting point and the amount of powdering by a V-bending test or the like are reduced, indicating that the processability is improved. The thickness of the Al—Fe alloy layer is more preferably 2 μm or less.

Chemical Composition of Coating Layer

Next, the chemical composition of the coating layer will be described.

In order to achieve stable sacrificial corrosion protection ability and corrosion resistance on flat surface, the chemical composition of the coating layer is as follows.

That is, the chemical composition of the coating layer is a chemical composition containing, in % by mass,
Zn: greater than 65.0%,
Al: from greater than 5.0% to less than 25.0%,
Mg: from greater than 3.0% to less than 12.5%,
Sn: from 0% to 3.00%,
Bi: from 0% to less than 5.0%,
In: from 0% to less than 2.0%,
Ca: from 0% to 3.0%,
Y: from 0% to 0.5%,
La: from 0% to less than 0.5%,
Ce: from 0% to less than 0.5%,
Si: from 0% to less than 2.5%,
Cr: from 0% to 0.25%,
Ti: from 0% to 0.25%,
Ni: from 0% to 0.25%,
Co: from 0% to 0.25%,
V: from 0% to 0.25%,
Nb: from 0% to 0.25%,
Cu: from 0% to 0.25%, Mn: from 0% to 0.25%,
Fe: from 0% to 5.0%,
Sr: from 0% to less than 0.5%,
Sb: from 0% to less than 0.5%,
Pb: from 0% to less than 0.5%,
B: from 0% to less than 0.5%, and
impurities.

In the chemical composition of the coating layer, Sn, Bi, In, Ca, Y, La, Ce, Si, Cr, Ti, Ni, Co, V, Nb, Cu, Mn, Fe, Sr, Sb, Pb, and B are optional components. That is, these elements need not be contained in the coating layer. When any of these optional components are contained, the content of each optional element is preferably in the range described below.

Here, the chemical composition of this coating layer is the average chemical composition of the entire coating layer (in a case in which the coating layer has a single-layer structure of a Zn—Al—Mg alloy layer, the average chemical composition of the Zn—Al—Mg alloy layer, and in a case in which the coating layer has a multilayer structure of an Al—Fe alloy layer and a Zn—Al—Mg alloy layer, the total average chemical composition of the Al—Fe alloy layer and the Zn—Al—Mg alloy layer).

Hereinafter, each element of the coating layer will be described.

Zn: Greater Than 65.0%

Zn is an element necessary for obtaining sacrificial corrosion protection ability in addition to corrosion resistance on flat surface. With regard to the Zn concentration, when considered in an atomic composition ratio, Zn is required to occupy the main portion also in the atomic composition ratio because the coating layer is composed together with elements having a low specific gravity such as Al and Mg.

Accordingly, the Zn concentration is set to greater than 65.0%. The Zn concentration is preferably 70% or more. The upper limit of the Zn concentration is a remnant concentration excluding elements other than Zn, and impurities.

Al: Greater Than 5.0% to Less Than 25.0%

Al is an essential element for forming Al crystals and ensuring both corrosion resistance on flat surface and sacrificial corrosion protection ability. Also, Al is an essential element for enhancing adhesion of the coating layer and ensuring processability. Accordingly, the lower limit of the Al concentration is set to greater than 5.0% (preferably 10.0% or more).

On the other hand, when the Al concentration increases, the sacrificial corrosion protection ability tends to deteriorate. Accordingly, the upper limit of the Al concentration is set to less than 25.0% (preferably 23.0% or less).

Mg: Greater Than 3.0% to Less Than 12.5%

Mg is an element essential for ensuring both corrosion resistance on flat surface and sacrificial corrosion protection ability. Also, Mg is an essential element for precipitating a developed coarse dendrite-shaped $MgZn_2$ phase. Accordingly, the lower limit of the Mg concentration is set to greater than 3.0% (preferably greater than 5.0%).

On the other hand, when the Mg concentration increases, the processability tends to deteriorate. Accordingly, the upper limit of the Mg concentration is set to less than 12.5% (preferably 10.0% or less).

Sn: From 0% to 3.00%

Sn is an element that forms a $Mg_2Sn$ phase which is a water-soluble structure, and imparts a high sacrificial corrosion protection ability. Accordingly, the lower limit of the Sn concentration is preferably greater than 0% (more preferably 0.05% or more, and still more preferably 0.10% or more).

On the other hand, when the Sn concentration increases, the corrosion resistance on flat surface tends to deteriorate. Accordingly, the upper limit of the Sn concentration is set to 3.00% or less (preferably 2.50% or less).

Bi: From 0% to Less Than 5.0%

Bi is an element contributing to the sacrificial corrosion protection ability. Accordingly, the lower limit of the Bi concentration is preferably greater than 0% (more preferably 0.1% or more, and still more preferably 3.0% or more).

On the other hand, when the Bi concentration increases, the corrosion resistance on flat surface tends to deteriorate. Accordingly, the upper limit of the Bi concentration is set to less than 5.0% (preferably 4.8% or less).

In: From 0% to Less Than 2.0%

In is an element contributing to the sacrificial corrosion protection ability. Accordingly, the lower limit of the In concentration is preferably greater than 0% (more preferably 0.1% or more, and still more preferably 1.0% or more).

On the other hand, when the In concentration increases, corrosion resistance on flat surface tends to deteriorate. Accordingly, the upper limit of the In concentration is set to less than 2.0% (preferably 1.8% or less).

Ca: From 0% to 3.0%

Ca is an element capable of adjusting the dissolution amount of Mg to a level that is optimal for imparting corrosion resistance on flat surface and sacrificial corrosion protection ability. Accordingly, the lower limit of the Ca concentration is preferably greater than 0% (more preferably 0.05% or more).

On the other hand, when the Ca concentration increases, the corrosion resistance on flat surface and the processability tend to deteriorate. Accordingly, the upper limit of the Ca concentration is set to 3.0% or less (preferably 1.0% or less).

Y: From 0% to 0.5%

Y is an element contributing to the sacrificial corrosion protection ability. Accordingly, the lower limit of the Y concentration is preferably greater than 0% (more preferably 0.1% or more).

On the other hand, when the Y concentration increases, the corrosion resistance on flat surface tends to deteriorate. Accordingly, the upper limit of the Y concentration is set to 0.5% or less (preferably 0.3% or less).

La and Ce: From 0% to Less Than 0.5%

La and Ce are elements contributing to the sacrificial corrosion protection ability. Accordingly, the lower limit of each of the La concentration and the Ce concentration is preferably greater than 0% (more preferably 0.1% or more).

On the other hand, when the La concentration and the Ce concentration increase, the corrosion resistance on flat surface tends to deteriorate. Accordingly, the upper limit of each of the La concentration and the Ce concentration is set to less than 0.5% (preferably 0.4% or less).

Si: From 0% to Less Than 2.5%

Si is an element that suppresses growth of the Al—Fe alloy layer and contributes to improvement of the corrosion resistance. Accordingly, the Si concentration is preferably greater than 0% (more preferably 0.05% or more, and still more preferably 0.1% or more).

On the other hand, when the Si concentration increases, the corrosion resistance on flat surface, the sacrificial corrosion protection ability, and the processability tend to deteriorate. Accordingly, the upper limit of the Si concentration is set to less than 2.5%. In particular, from the viewpoints of corrosion resistance on flat surface and sacrificial corrosion protection ability, the Si concentration is preferably 2.4% or less, more preferably 1.8% or less, and still more preferably 1.2% or less.

Cr, Ti, Ni, Co, V, Nb, Cu, and Mn: From 0% to 0.25%

Cr, Ti, Ni, Co, V, Nb, Cu, and Mn are elements contributing to the sacrificial corrosion protection ability. Accordingly, the lower limit of each of the Cr, Ti, Ni, Co, V, Nb, Cu, and Mn concentrations is preferably greater than 0% (more preferably 0.05% or more, and still more preferably 0.1% or more).

On the other hand, when the Cr, Ti, Ni, Co, V, Nb, Cu, and Mn concentrations increase, the corrosion resistance on flat surface tends to deteriorate. Accordingly, the upper limit of each of the Cr, Ti, Ni, Co, V, Nb, Cu, and Mn concentrations is set to 0.25% or less. The upper limit of each of the Cr, Ti, Ni, Co, V, Nb, Cu, and Mn concentrations is preferably 0.22% or less.

Fe: From 0% to 5.0%

In a case in which the coating layer is formed by a hot-dip coating method, certain amounts of Fe are contained in the Zn—Al—Mg alloy layer and the Al—Fe alloy layer.

It has been confirmed that there are no adverse effects on the performances even when Fe is contained in the coating layer (in particular, Zn—Al—Mg alloy layer) up to a concentration of 5.0%. Since most of the Fe is contained in the Al—Fe alloy layer in many cases, the Fe concentration is generally high when the thickness of this layer is large.

Sr, Sb, Pb, and B: From 0% to Less Than 0.5%

Sr, Sb, Pb, and B are elements contributing to the sacrificial corrosion protection ability. Accordingly, the lower limit of each of the Sr, Sb, Pb, and B concentrations is preferably greater than 0% (more preferably 0.05% or more, and still more preferably 0.1% or more).

On the other hand, when the Sr, Sb, Pb, and B concentrations increase, the corrosion resistance on flat surface tends to deteriorate. Accordingly, the upper limit of each of the Sr, Sb, Pb, and B concentrations is set to less than 0.5%.

Impurities

The impurities refer to components contained in the raw product s or components that are mixed in the manufacturing step and not intentionally contained. For example, in the coating layer, trace amounts of components other than Fe may be mixed as impurities due to mutual atomic diffusion between the base steel and the coating bath.

The chemical components of the coating layer are measured by the following method.

First, an acid solution in which the coating layer has been peeled off and dissolved with an acid containing an inhibitor that inhibits corrosion of the base steel is obtained. Next, the obtained acid solution is measured by an ICP analysis, whereby the chemical composition of the coating layer (in a case in which the coating layer has a single-layer structure of a Zn—Al—Mg alloy layer, the chemical composition of the Zn—Al—Mg alloy layer, in a case in which the coating layer has a multilayer structure of an Al—Fe alloy layer and a Zn—Al—Mg alloy layer, the total chemical composition of the Al—Fe alloy layer and the Zn—Al—Mg alloy layer) can be obtained. The kind of the acid is not particularly limited as long as it is an acid capable of dissolving the coating layer. The chemical composition is measured as the average chemical composition. In ICP analysis, the Zn concentration is determined according to "Formula: Zn concentration=100%−concentrations (%) of other elements".

Here, in a case in which a pre-coated steel product is used as the base steel, the components of the pre-coating are also detected.

For example, in a case in which a Ni pre-coated steel product is used, not only Ni in the coating layer but also Ni in the Ni pre-coating is detected by ICP analysis. Specifically, for example, in a case in which a pre-coated steel product having a Ni deposited amount of from 1 $g/m^2$ to 3 $g/m^2$ is used as the base steel, even when the concentration of Ni contained in the coating layer is 0%, the Ni concentration is detected as from 0.1 to 15%. In a case in which a Ni pre-coated steel product is used as the base steel, a trace amount of Ni in the Ni pre-coating layer is dissolved in the coating bath when the base steel is immersed in the coating bath. Thus, the Ni concentration in the coating bath is from 0.02 to 0.03% higher than the Ni concentration in the coating bath that is initially made-up. Accordingly, in a case in which a Ni pre-coated steel product is used, the Ni concentration in the coating layer is increased by 0.03% at the maximum.

A method of determining whether or not the base steel is a Ni pre-coated steel product is as follows.

A sample is taken from a target steel product such that a cross section cut along the thickness direction of the coating layer serves as a measurement surface.

The vicinity of the interface between the coating layer and the base steel in the steel product product on the measurement surface of the sample is linearly analyzed by an Electron Probe MicroAnalyser (FE-EPMA) to measure the Ni concentration. The measurement conditions are an acceleration voltage of 15 kV, a beam diameter of about 100 nm, an irradiation time per point of 1,000 ms, and a measurement pitch of 60 nm. The measurement distance may be any distance as long as it is possible to confirm whether or not the Ni concentration is increased at the interface between the coating layer and the base steel in the steel product.

When the Ni concentration is increased at the interface between the coating layer and the base steel in the steel product, it is determined whether or not the base steel is the pre-coated steel product.

In the disclosure, in a case in which a Ni pre-coated steel product is used, when the Ni concentration detected by ICP analysis is from 0.28% (0.25% (upper limit of the Ni concentration in the coating layer)+0.03%) to 15%, the Ni concentration of the coating layer is regarded as 0%. The Zn concentration at this time is calculated by "Formula: Zn concentration=100%−concentrations (%) of other elements excluding Ni".

On the other hand, in a case in which a Ni pre-coated steel product is used, when the Ni concentration detected by ICP analysis is greater than 15%, it is regarded that the coating layer contains Ni in an amount of greater than 0.25% (upper limit of the Ni concentration in the coating layer). In the disclosure, the components of the coating layer are measured using only the ICP analysis method, but the Ni concentration in the coating layer can be analyzed by using glow discharge optical emission spectrometry (quantitative GDS) in addition to the ICP analysis method.

Specifically, the Ni concentration of the coating layer is determined to be the ICP Ni concentration−0.03% when the Ni concentration obtained by the ICP analysis (ICP Ni concentration) satisfies Inequality A, the Ni concentration of the coating layer is determined to be 0% when the ICP Ni concentration satisfies Inequality B, the Ni concentration of the coating layer is determined to be 0.25% when the ICP Ni concentration satisfies Inequality C, and the Ni concentration of the coating layer is determined to be the ICP Ni concentration−15% when the ICP Ni concentration satisfies Inequality D.

Inequality A: ICP Ni concentration<0.28
Inequality B: $0.28 \leq$ ICP Ni concentration$\leq 15$
Inequality C: 15<ICP Ni concentration$\leq 15.25$
Inequality D: 15.25<ICP Ni concentration Metal Structure of Zn—Al—Mg Alloy Layer Next, the metal structure of the Zn—Al—Mg alloy layer will be described.

The Zn—Al—Mg alloy layer has dendrite-shaped $MgZn_2$ phase having a surface roughness Sa of 50 nm or less on the surface.

The area ratio of the dendrite-shaped $MgZn_2$ phase having a surface roughness Sa of 50 nm or less is from 30% to 80% within a region of an observable field of view of 5 mm$^2$.

Among the dendrite-shaped $MgZn_2$ phase having a surface roughness Sa of 50 nm or less, the number of coarse dendrite-shaped $MgZn_2$ phase (dendrite-shaped $MgZn_2$ phase having an area of 0.1 mm$^2$ or more) is from 5 to 100 within a region of an observable field of view of 25 mm$^2$.

Here, the dendrite-shaped $MgZn_2$ phase is a structure that is composed of an $MgZn_2$ phase and has a configuration having a primary arm (i.e., main stem) and a secondary arm (i.e., second stem) grown in a branch shape from the primary arm (see FIG. 1). Here, in FIG. 1, Arm1 represents a primary arm, and Arm2 represents a secondary arm. The dendrite-shaped $MgZn_2$ phase may have a tertiary arm grown in a branch shape from the secondary arm and a quaternary arm grown in a branch shape from the tertiary arm.

The $MgZn_2$ phase having a surface roughness Sa of greater than 50 nm has a low regular reflectance and does not contribute to imparting a spangle appearance.

In a case in which the area ratio of the $MgZn_2$ phase having a surface roughness Sa of 50 nm or less is too low, regions having a high regular reflectance decrease. On the other hand, in a case in which the area ratio of the $MgZn_2$ phase having a surface roughness Sa of 50 nm or less is too high, regions with high regular reflectance increase. That is, even when the area ratio of the $MgZn_2$ phase having a surface roughness Sa of 50 nm or less is too low or too high, it is not possible to recognize a spangle appearance due to a difference in regular reflectance.

Thus, the area ratio of the dendrite-shaped $MgZn_2$ phase having a surface roughness Sa of 50 nm or less is set to from 30% to 80% within a region of an observable field of view of 5 mm$^2$.

In addition, fine dendrite-shaped $MgZn_2$ phase having an area of 0.1 mm$^2$ or less cannot be recognized as a spangle appearance due to a difference in regular reflectance. In a case in which the number of the coarse dendrite-shaped $MgZn_2$ phase is too small, the number of the dendrite-shaped $MgZn_2$ phase that can be recognized as a spangle appearance decreases. On the other hand, in a case in which the number of coarse dendrite-shaped $MgZn_2$ phase is too large, the number of dendrite-shaped $MgZn_2$ phase that can be recognized as a spangle appearance increases. That is, in a case in which the number of coarse dendrite-shaped $MgZn_2$ phase is too small or too large, it is not possible to recognize a spangle appearance due to a difference in regular reflectance.

Thus, among the dendrite-shaped $MgZn_2$ phase having a surface roughness Sa of 50 nm or less, the number of coarse dendrite-shaped $MgZn_2$ phase is set to from 5 to 100 within a region of an observable field of view of 25 mm$^2$.

From the viewpoint of imparting a beautiful spangle appearance, the area ratio of the dendrite-shaped $MgZn_2$ phase having a surface roughness Sa of 50 nm or less is preferably from 35% to 75%, and more preferably from 40% to 70% within a region of an observable field of view of 5 mm$^2$.

From the viewpoint of imparting a beautiful spangle appearance, the number of coarse dendrite-shaped $MgZn_2$ phase is preferably from 10 to 90, and more preferably from 15 to 85 within a region of an observable field of view of 25 mm$^2$.

The method of measuring the area ratio of dendrite-shaped $MgZn_2$ phase having a surface roughness Sa of 50 nm or less and the number of coarse dendrite-shaped $MgZn_2$ phase (dendrite-shaped $MgZn_2$ phase having an area of 0.1 mm$^2$ or more) having a surface roughness Sa of 50 nm or less is as follows.

First, a sample having a coating layer surface of 1 cm×1 cm square is taken from a coated steel product to be measured. However, the sample is taken from a portion which is not in the vicinity of the punched end face (within 2 mm from the end face) of the coated steel product and is free from defects of the coating layer.

Next, the surface of the coating layer (specifically, Zn—Al—Mg alloy layer) of the sample is observed with an optical microscope (magnification: 5×). The observable field of view is set to 5 mm$^2$.

Then, the surface roughness Sa of the dendrite-shaped $MgZn_2$ phase is measured in an observable field of view of 5 mm$^2$ by an atomic force microscope (AFM).

Specifically, the surface roughness Sa of each of arbitrary five positions in the primary arm and the secondary arm of the dendrite-shaped $MgZn_2$ phase is measured by an atomic force microscope (AFM). The arithmetic average value of the surface roughness Sa at a total of 10 positions is calculated.

The measurement conditions of the atomic force microscope (AFM) are as follows.

Scanning mode: dynamic force mode (DFM)
Measurement range: 15 μm×15 μm square

Then, in the observable field of view of 5 mm$^2$, the area ratio of dendrite-shaped $MgZn_2$ phase having a surface roughness Sa of 50 nm or less is determined. This operation is performed at five positions to obtain a calculated average value of the area ratio. This arithmetic average value is defined as the "area ratio of dendrite-shaped $MgZn_2$ phase having a surface roughness Sa of 50 nm or less".

Figure 2:
FIG. 2 is an optical micrograph (magnification: 5×) showing another example of the surface of the Zn—Al—Mg alloy layer of a coated steel product of the disclosure.

Here, the area of one dendrite-shaped $MgZn_2$ phase having a surface roughness Sa of 50 nm or less is an area of a region surrounding the outer periphery of the dendrite-shaped $MgZn_2$ phase passing through the root and the tip of the primary arm and the tips of the nth arms (specifically, from the secondary arm to the quaternary arm) located on the outer side of the dendrite-shaped $MgZn_2$ phase (in FIG. 2, see A).

Then, the number of coarse dendrite-shaped $MgZn_2$ phase among the dendrite-shaped $MgZn_2$ phase having a surface roughness Sa of 50 nm or less is counted in 5 observable field of view of 5 $mm^2$ (i.e., within a region of an observable field of view of 25 $mm^2$). This number is defined as the "number of coarse dendrite-shaped $MgZn_2$ phase (dendrite-shaped $MgZn_2$ phase having an area of 0.1 $mm^2$ or more) within a region of an observable field of view of 25 $mm^2$".

Method of Producing Coated Steel Product

Next, an example of a method of producing a coated steel product of the disclosure will be described. Hereinafter, a method of producing a coated steel sheet will be described as an example of the coated steel product.

The coated steel product of the disclosure is obtained by forming a coating layer having the above-described predetermined chemical composition and metal structure on the surface(s) (i.e., one side or both sides) of a base steel sheet as a base steel in accordance with a hot-dip coating method.

Specifically, as an example, hot-dip coating is performed under the following conditions.

The outline of the producing method is as follows. First, the surface to be coated of a base steel sheet is subjected to brush-grinding such that the relative surface area of the surface to be coated of the base steel sheet is from greater than 100 to 150%. Here, the relative surface area is a ratio of an actual surface area to a completely flat surface. A detailed definition of the relative surface area will be described later for convenience of description. Here, the surface to be coated refers to a surface of a base steel sheet on which a coating layer is formed.

Next, the base steel sheet after brush-grinding is immersed in a coating bath, the base steel sheet is pulled up from the coating bath, and then is cooled in a temperature range from the coating bath temperature to 410° C. at an average cooling rate that is from 1.5 times to 5 times the average cooling rate in the temperature range from 410° C. to 380° C.

Then, cooling in the temperature range from 410° C. to 380° C. is performed at an average cooling rate of from 0.5° C./s to 9° C./s.

Thereafter, cooling in the temperature range from 380° C. to 300° C. is performed at an average cooling rate that is from 4 times to 15 times the average cooling rate in the temperature range from 410° C. to 380° C.

The outline of the above producing method will be described in detail below. That is, an example of the method of producing a coated steel product of the disclosure is as follows. That is, the surface to be coated of a base steel sheet is subjected to brush-grinding such that the relative surface area of the surface to be coated of the base steel sheet is from greater than 100% to 150%. The relative surface area of the surface to be coated of the base steel sheet is preferably from 105 to 150% of that before grinding by brush grinding. The brush grinding is performed with, for example, a nylon brush containing abrasive grains such as alumina, silicon carbide, or diamond powder.

Thereafter, the base steel sheet is hot-dip coated under conditions including a three-stage cooling that satisfies Inequality (1): $A \geq 1.5 \times B$, Inequality (2): $B \leq 9°$ C./s, and Inequality (3): $C \geq 4 \times B$ wherein A is the average cooling rate in the temperature range from the coating bath temperature to 410° C., B is the average cooling rate in the temperature range from 410° C. to 380° C., and C is the average cooling rate in the temperature range from 380° C. to 300° C.

However, the upper limit of the average cooling rate A in the temperature range from the coating bath temperature to 410° C. is set to 5 times the average cooling rate B or less from the viewpoint of appearance defects such as ripple marks.

The lower limit of the average cooling rate B in the temperature range from 410° C. to 380° C. is set to 0.5° C./s or more from the viewpoint of preventing the coating layer from being wound around the top roll due to insufficient cooling during production.

The upper limit of the average cooling rate C in the temperature range from 380° C. to 300° C. is set to 15 times the average cooling rate B or less from the viewpoint of suppressing appearance defects such as uneven patterns.

Here, the coating bath temperature is preferably set to the melting point of the coating bath+20° C. or higher.

By adjusting the relative surface area of the surface to be coated of the base steel sheet before hot-dip coating to from greater than 100 to 150% (preferably 105% to 150%) as described above, nuclei of Al primary crystals are easily formed uniformly during coating solidification. Uniform nuclei of Al primary crystals are formed during coating, and an $MgZn_2$ phase is precipitated around the uniform Al primary crystal through the next cooling step. Thus, even when the $MgZn_2$ phase develops in a coarse dendrite shape, the surface roughness Sa can be 50 nm or less.

In a case in which the base steel sheet is a cold-rolled product, the relative surface area of the surface to be coated of the base steel sheet before hot-dip coating is almost 100%. Thus, the relative surface area of the surface to be coated is adjusted to from greater than 100 to 150% by brush grinding.

In a case in which the base steel sheet is a hot-rolled product, the relative surface area of the surface to be coated of the base steel sheet before hot-dip coating exceeds 150%. Thus, the relative surface area of the surface to be coated is adjusted to from greater than 100 to 150% by brush grinding.

In a case in which the base steel sheet is a pre-coated steel sheet, the relative surface area of the pre-coated steel sheet is adjusted to from greater than 100 to 150%. In order to achieve this, the relative surface area of the base steel sheet before pre-coating may be appropriately adjusted depending on the coating amount of pre-coating. That is, in a case in which the base steel sheet is a pre-coated steel sheet, the surface to be coated of the base steel sheet before pre-coating is subjected to brush-grinding such that the relative surface area of the base steel sheet after pre-coating is from greater than 100 to 150%.

Here, the relative surface area of a base steel such as a base steel sheet is defined by the following formula: relative surface area=(perimeter X/reference length $L)^2 \times 100$ wherein X is the perimeter (length along surface irregularities) of the surface to be coated of the base steel, and L is the reference length.

A specific method of measuring the relative surface area is as follows.

First, a sample having a surface of 1 cm×1 cm square is taken from a base steel to be measured. However, the sample is taken from a portion which is not in the vicinity of the punched end face (within 2 mm from the end face) of the base steel.

Next, the perimeter X of the surface to be coated of the base steel sample is measured by observation of the cross section of the base steel with a scanning electron microscope (i.e., observation of the cross section cut along the thickness direction of the base steel).

Figure 3:
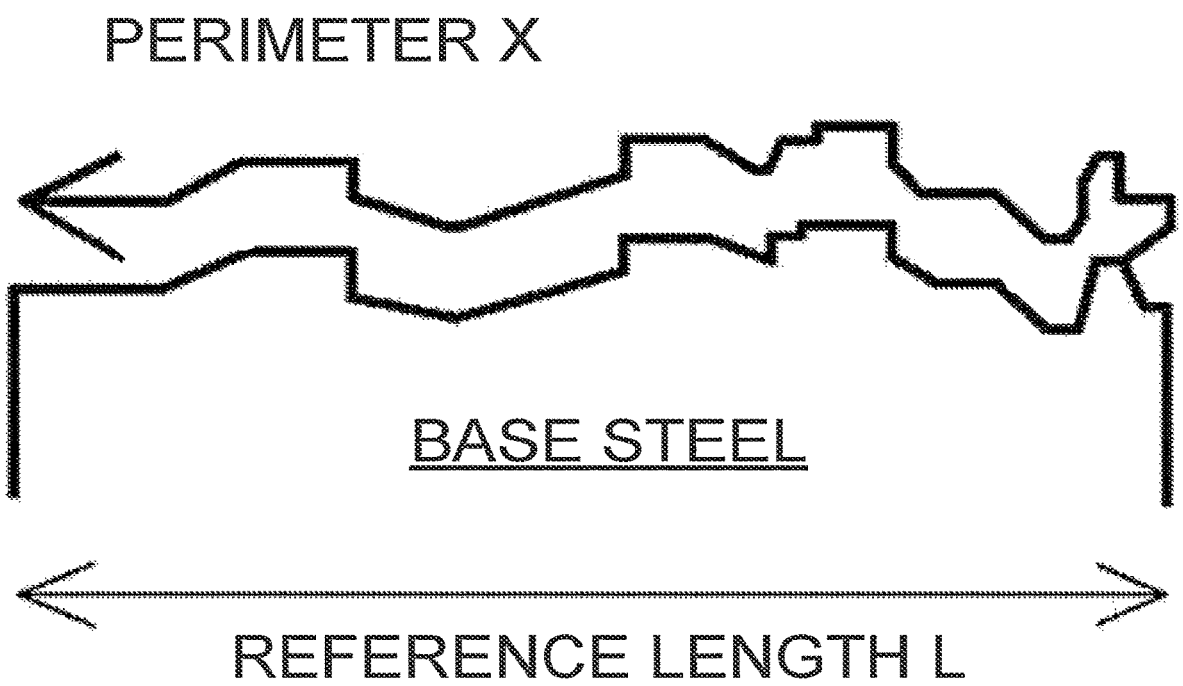
FIG. 3 is a schematic view for explaining a definition of the relative surface area of the base steel of a coated steel product of the disclosure.

The reference length L and the perimeter X are defined as follows (see FIG. 3).

Reference length L: a horizontal length of a view field in observation of the surface to be coated of the base steel at magnification of 10,000×

Perimeter X: a length determined by tracing a surface to be coated of the base steel in the view field In a case in which the object to be measured is a coated steel product, the interface between the coating layer and the base steel is observed to measure the reference length L and the perimeter X.

From the obtained perimeter X, the relative surface area is calculated by the above-described formula.

Then, the above-described operation is performed at arbitrary three positions, and a calculated average value of the obtained relative surface areas is obtained. This calculated average value is defined as a "relative surface area".

By immersing the base steel sheet in a coating bath, pulling up the base steel sheet from the coating bath, and then performing the primarily cooling at an average cooling rate satisfying Inequality (1) in the temperature range of from the coating bath temperature to 410° C., the Al phase is precipitated in the coating layer while sufficiently developing in a dendrite shape. At the same time, deterioration of the surface property of the coating layer caused by the coating layer in an unsolidified state due to mist cooling is suppressed. The average cooling rate satisfying Inequality (1) is achieved by, for example, air cooling with a high wind speed.

By performing the secondarily cooling at an average cooling rate satisfying Inequality (2) in the temperature range of from 410° C. to 380° C., the $MgZn_2$ phase is sufficiently precipitated around the developed dendrite-shaped Al phase. As a result, a coarse dendrite-shaped $MgZn_2$ phase appears on the surface of the Zn—Al—Mg alloy layer, and a structure that satisfies the area ratio of dendrite-shaped $MgZn_2$ phase having a surface roughness Sa of 50 nm or less and satisfies the number of coarse dendrite-shaped $MgZn_2$ phase is obtained. The average cooling rate satisfying Inequality (2) is achieved by, for example, air cooling with a low wind speed.

Here, in the coated steel sheet having a sheet thickness in the range of from 0.4 mmt to 9 mmt, from the viewpoint of sufficiently precipitating the $MgZn_2$ phase around developed dendrite-shaped Al phase to obtain a structure that satisfies the area ratio of dendrite-shaped $MgZn_2$ phase having a surface roughness Sa of 50 nm or less and satisfies the number of coarse dendrite-shaped $MgZn_2$ phase, it is preferable to perform the secondarily cooling at an average cooling rate of from 1 to 9° C./s in the temperature region from 410° C. to 380° C.

It is noted that 410° C. is in a temperature range of about the coating solidification start temperature−50° C. The coating solidification start temperature can be measured by the following method. A sample is taken from a coating bath, heated by differential scanning calorimetry (DSC) to a temperature equal to the melting point of the coating bath +20° C. or higher, and then cooled at 10° C./min. The temperature at which the first DSC peak appears is defined as the coating solidification start temperature.

By performing the tertiary cooling at an average cooling rate satisfying Inequality (3) in the temperature range of from 380° C. to 300° C., winding the coating around the top roll and the like is prevented and appearance defects such as ripple marks are suppressed. The average cooling rate satisfying Inequality (3) is achieved by, for example, mist cooling.

The Al—Fe alloy layer to be formed between the base steel sheet and the Zn—Al—Mg alloy layer is rapidly formed and grown in a time less than 1 second immediately after immersion in the coating bath. The growth rate is higher when the temperature of the coating bath is higher, and becomes further higher when the immersion time in the coating bath is longer. However, when the coating bath temperature is less than 500° C., the growth substantially ceases. Thus, it is better to reduce the immersion time or to move to the cooling step immediately after solidification.

With respect to a coated steel sheet, when the coated steel sheet is re-heated to re-melt the once solidified coating layer, the constituent phase totally disappear and turn into a liquid phase state. Accordingly, for example, with respect to a coated steel sheet that has once undergone quenching or the like, the structure control defined in the disclosure can be performed in a step where an appropriate heat treatment is carried out by re-heating offline. In this case, it is preferable that the re-heating temperature of the coating layer is set in a temperature range just above the melting point of the coating bath, so that the Al—Fe alloy layer is not grown excessively.

Hereinafter, post-treatments applicable to a coated steel product of the disclosure will be described.

A film may be formed on the coating layer of a coated steel product of the disclosure. The film may be constituted with a single layer or two or more layers. Examples of the kind of the film that is directly on the coating layer include a chromate film, a phosphate film, and a chromate-free film. A chromate treatment, a phosphate treatment, and a chromate-free treatment for forming these films can be performed by known methods.

As the chromate treatment, there are an electrolytic chromate treatment in which a chromate film is formed by electrolysis, a reactive chromate treatment in which a film is formed by utilizing a reaction with a product, and thereafter, the excess treatment liquid is washed off, and an application type chromate treatment in which a film is formed by applying a treatment liquid to an object and drying without washing with water. Any of these treatments may be employed.

Examples of the electrolytic chromate treatment include electrolytic chromate treatments using chromic acid, a silica sol, a resin (such as an acrylic resin, a vinyl ester resin, a vinyl acetate/acrylic emulsion, a carboxylated styrene butadiene latex, or a diisopropanolamine-modified epoxy resin), and hard silica.

Examples of the phosphate treatment include a zinc phosphate treatment, a zinc calcium phosphate treatment, and a manganese phosphate treatment.

Chromate-free treatments are particularly suitable because they do not impose a burden on the environment. As the chromate-free treatment, there are an electrolytic type chromate-free treatment in which a chromate-free film is formed by electrolysis, a reactive chromate-free treatment in which a film is formed by utilizing a reaction with a product, and thereafter, the excess treatment liquid is washed off, and an application type chromate-free treatment in which a film is formed by applying a treatment liquid to an object and drying without washing with water. Any of these treatments may be employed.

Moreover, one layer or two or more layers of organic resin film may be provided on the film that is directly on the coating layer. The kind of the organic resin is not particularly limited, and examples thereof include polyester resins, polyurethane resins, epoxy resins, acrylic resins, polyolefin resins, and modified products of these resins. Here, the modified product refers to a resin obtained by reacting a reactive functional group contained in the structure of these resins with another compound (a monomer, a crosslinking agent, or the like) that has, in the structure thereof, a functional group capable of reacting with the aforementioned functional group.

As such an organic resin, one kind or a mixture of two or more kinds of (unmodified) organic resins may be used, or one kind or a mixture of two or more kinds of organic resins obtained by modifying at least one kind of organic resin in the presence of at least one other kind of organic resin may be used. The organic resin film may contain an optional coloring pigment or rust preventive pigment. A water-based form prepared by dissolution or dispersion in water can also be used.

EXAMPLE

Examples of the disclosure will be described. However, the conditions in the Examples are one example of conditions that are employed in order to confirm the feasibility and effects of the disclosure, and the disclosure is not limited to this one example of conditions. The disclosure can employ various conditions insofar as the object of the disclosure is achieved without departing from the gist of the disclosure.

Examples

In order to obtain a coating layer having a chemical composition shown in Table 1 and Table 2, a predetermined amount of a pure metal ingot was used, the ingot was melted in a vacuum melting furnace, and then a coating bath was prepared in air. A batch-wise hot-dip coating apparatus was used for producing coated steel products.

A general hot-rolled carbon steel sheet (C concentration<0.1%) having a sheet thickness of 2.3 mm was used as the base steel, and degreasing and pickling were performed immediately before the coating step. Then, the surface to be coated of the base steel was subjected to brush grinding with a brush roll containing abrasive grains so as to have the relative surface area shown in Table 1 and Table 2.

In some examples, a Ni pre-coated steel sheet that was obtained by applying Ni pre-coating to a general hot-rolled carbon steel sheet having a sheet thickness of 2.3 mm was used as the base steel. The deposited amount of Ni was from 1 to 3 $g/m^2$. However, the Ni pre-coating was performed after brush grinding.

An example in which a Ni pre-coated steel sheet was used as the base steel was marked "Pre-Ni" in the "Base steel" column in the table, and the Ni concentration in the coating bath was written in parentheses in the Ni concentration column.

In any sample production, the same reduction treatment method was applied to the base steel as a step before immersion in the coating bath. That is, the base steel was heated from room temperature to 800° C. by electric heating in an $N_2$-$H_2$ (5%) environment (dew point of −40° C. or lower, oxygen concentration of less than 25 ppm), held for 60 seconds, then cooled to a coating bath temperature+10° C. by $N_2$ gas blow, and immediately immersed in the coating bath.

In any of the coated steel sheets, the immersion time in the coating bath was the time in the table. The $N_2$ gas wiping pressure was adjusted such that a coated steel sheet with a coating thickness of 30 μm (±1 μm) was produced.

The standard temperature of the coating bath was set to the melting point +20° C., and coating was performed at a higher temperature in some cases. The coating bath immersion time was set to 2 seconds. The base steel was pulled up from the coating bath, and then subjected to a cooling process in which the average cooling rates of the following first to third stages shown in Table 1 and Table 2 were set to the conditions shown in Table 1 and Table 2, yielding a coating layer.

Average cooling rate in the first stage: average cooling rate in the temperature range from the coating bath temperature to 410° C.

Average cooling rate in the second stage: average cooling rate in the temperature range from 410° C. to 380° C.

Average cooling rate in the third stage: average cooling rate in the temperature range from 380° C. to 300° C.

Various Measurements

A sample was cut out from the obtained coated steel sheet. Then, the following items were measured according to the above-described methods.

The area ratio of dendrite-shaped $MgZn_2$ phase having a surface roughness Sa of 50 nm or less within a region of an observable field of view of 5 $mm^2$ (denoted as "Area ratio of D-$MgZn_2$" in the table)

The number of coarse dendrite-shaped $MgZn_2$ phase (dendrite-shaped $MgZn_2$ phase having an area of 0.1 $mm^2$ or more) present within a region of an observable field of view of 25 $mm^2$ among the dendrite-shaped $MgZn_2$ phase having a surface roughness Sa of 50 nm or less (denoted as "Number of D-$MgZn_2$" in the table)

The thickness of the Al—Fe alloy layer (thickness of the Al—Ni—Fe alloy layer in an example in which a Ni pre-coated steel sheet was used as the base steel)

Corrosion Resistance on Flat Surface

In order to compare the corrosion resistance on flat surfaces, the produced samples were subjected to an accelerated corrosion test (SST JIS Z 2371: 2015) for 2,000 hours, and the average value of red rust formation area ratios of the flat surfaces was evaluated. Cases in which the average red rust formation area ratio was 3% or less, and the maximum value and the minimum value of the red rust formation area ratio in n=5 were within ±100% of the average value were rated as "A+", cases in which the average red rust formation area ratio was 5% or less, and the maximum value and the minimum value of the red rust formation area ratio in n=5 were within ±100% of the average value were rated as "A", and the other cases were rated as "NG".

Sacrificial Corrosion Protection Ability (Cut Edge Corrosion Resistance)

In order to compare the sacrificial corrosion protection abilities (cut edge corrosion resistances), samples were sheared into 50 mm×100 mm, the upper and lower end faces were sealed, and a corrosion acceleration test (JASO M 609-91) was performed 60 cycles. Then the average value of the red rust formation area ratios on the lateral exposed end faces was evaluated. Cases in which the red rust formation area ratio was 40% or less were rated as "A+", cases in which the red rust formation area ratio was 50% or less were rated as "A", and cases in which the red rust formation area ratio was greater than 60% were rated as "NG".

Processability

In order to evaluate the processability of the coating layer, the coated steel sheet was subjected to 90° V bending, a cellophane tape having a width of 24 mm was pressed onto the trough of the V-bend and pulled off, and powdering was evaluated visually. Cases in which the peeled-off powder due to powdering did not adhere to the tape were rated as "A", cases in which a slight amount of powder adhered were rated as "A−", and cases in which a significant amount of powder adhered were rated as "NG".

Spangle Appearance

The spangle appearance was evaluated as follows.

The glossiness at an incident angle of 60° was measured with a handy-type gloss meter (PG-1 manufactured by Nippon Denshoku Industries Co., Ltd.), and also the sample was visually inspected from four directions of north, south, east, and west, and from the direction of 45° to 60° from horizontal. Samples in which a large spangle pattern was clearly observed and the glossiness was 30 or more were rated as "A+", samples in which it was possible to recognize a spangle pattern even though the spangle pattern was small and the glossiness was 30 or more were rated as "A", samples in which it was not possible to recognize any spangle pattern and the glossiness was 30 or more were rated as "NG+", and samples in which it was not possible to recognize any spangle pattern and the glossiness was less than 30 were rated as "NG".

The Examples are listed in Table 1 and Table 2.

TABLE 1-1

| No. | Category | Base steel Type | Relative surface area % | Coating bath melting point (° C.) | Coating bath temperature (° C.) | Immersion time (Seconds) | First stage average cooling rate (° C./s) | Second stage average cooling rate (° C./s) | Third stage average cooling rate (° C./s) |
|---|---|---|---|---|---|---|---|---|---|
| 1 | Example | — | 125 | 400 | 420 | 2 | 10 | 5 | 30 |
| 2 | Example | — | 130 | 470 | 490 | 2 | 10 | 5 | 30 |
| 3 | Example | — | 122 | 460 | 480 | 2 | 10 | 5 | 30 |
| 4 | Example | — | 117 | 465 | 485 | 2 | 10 | 5 | 30 |
| 5 | Example | — | 135 | 460 | 480 | 2 | 10 | 5 | 30 |
| 6 | Example | — | 104 | 460 | 480 | 2 | 10 | 5 | 30 |
| 7 | Example | — | 111 | 460 | 480 | 2 | 10 | 5 | 30 |
| 8 | Example | — | 119 | 460 | 480 | 2 | 10 | 5 | 30 |
| 9 | Example | — | 146 | 460 | 480 | 2 | 10 | 5 | 30 |
| 10 | Example | — | 124 | 460 | 480 | 2 | 10 | 5 | 30 |
| 11 | Example | — | 118 | 470 | 490 | 2 | 10 | 5 | 30 |
| 12 | Example | — | 103 | 460 | 480 | 2 | 10 | 5 | 30 |
| 13 | Example | — | 136 | 460 | 480 | 2 | 10 | 5 | 30 |
| 14 | Example | — | 130 | 450 | 470 | 2 | 10 | 5 | 30 |
| 15 | Example | — | 127 | 440 | 460 | 2 | 10 | 5 | 30 |
| 16 | Example | — | 120 | 440 | 460 | 2 | 10 | 5 | 30 |
| 17 | Example | — | 133 | 400 | 420 | 2 | 10 | 5 | 30 |
| 18 | Example | — | 109 | 460 | 480 | 2 | 10 | 5 | 30 |
| 19 | Example | — | 140 | 460 | 480 | 2 | 10 | 5 | 30 |
| 20 | Example | — | 115 | 460 | 480 | 2 | 10 | 5 | 30 |
| 21 | Example | — | 139 | 460 | 480 | 2 | 10 | 5 | 30 |
| 22 | Example | — | 141 | 460 | 480 | 2 | 10 | 5 | 30 |
| 23 | Example | — | 123 | 460 | 480 | 2 | 10 | 5 | 30 |
| 24 | Example | — | 135 | 460 | 480 | 2 | 10 | 5 | 30 |
| 25 | Example | — | 106 | 460 | 480 | 2 | 10 | 5 | 30 |
| 26 | Example | — | 108 | 460 | 480 | 2 | 10 | 5 | 30 |
| 27 | Example | — | 124 | 470 | 490 | 2 | 10 | 5 | 30 |
| 28 | Example | — | 129 | 460 | 480 | 2 | 10 | 5 | 30 |
| 29 | Example | — | 121 | 460 | 480 | 2 | 10 | 5 | 30 |
| 30 | Example | — | 132 | 460 | 480 | 2 | 10 | 5 | 30 |
| 31 | Example | — | 111 | 460 | 480 | 2 | 10 | 5 | 30 |
| 32 | Example | — | 142 | 460 | 480 | 2 | 10 | 5 | 30 |
| 33 | Example | — | 133 | 460 | 480 | 2 | 10 | 5 | 30 |
| 34 | Example | — | 114 | 460 | 480 | 2 | 10 | 5 | 30 |
| 35 | Example | — | 106 | 460 | 480 | 2 | 10 | 5 | 30 |
| 36 | Example | — | 141 | 460 | 550 | 2 | 10 | 5 | 30 |
| 37 | Example | — | 110 | 460 | 480 | 2 | 10 | 5 | 30 |
| 38 | Example | — | 133 | 460 | 480 | 2 | 10 | 5 | 30 |
| 39 | Example | — | 107 | 460 | 480 | 2 | 10 | 5 | 30 |
| 40 | Example | — | 121 | 460 | 480 | 2 | 10 | 5 | 30 |
| 41 | Example | Pre-Ni | 106 | 460 | 480 | 2 | 10 | 5 | 30 |
| 42 | Example | Pre-Ni | 131 | 460 | 480 | 2 | 10 | 5 | 30 |
| 43 | Example | Pre-Ni | 125 | 460 | 480 | 2 | 10 | 5 | 30 |
| 44 | Example | Pre-Ni | 120 | 460 | 480 | 2 | 10 | 5 | 30 |

[Table 1-2]

TABLE 1-2

| No. | Category | Coating layer composition (mass %) | | | | | | | | | | | | |
|---|---|---|---|---|---|---|---|---|---|---|---|---|---|---|
| | | Zn | Al | Mg | Sn | Bi | In | Ca | Y | La | Ce | Si | Cr | Ti |
| 1 | Example | 89.32 | 5.5 | 4 | 0.08 | 0 | 0 | 0 | 0 | 0 | 0 | 1 | 0 | 0 |
| 2 | Example | 69.32 | 24.5 | 6 | 0.08 | 0 | 0 | 0 | 0 | 0 | 0 | 0 | 0 | 0 |
| 3 | Example | 78.32 | 18 | 3.5 | 0.08 | 0 | 0 | 0 | 0 | 0 | 0 | 0 | 0 | 0 |
| 4 | Example | 69.82 | 18 | 12 | 0.08 | 0 | 0 | 0 | 0 | 0 | 0 | 0 | 0 | 0 |
| 5 | Example | 75.8 | 18 | 6 | 0.10 | 0 | 0 | 0 | 0 | 0 | 0 | 0 | 0 | 0 |
| 6 | Example | 75.5 | 18 | 6 | 0.10 | 0 | 0 | 0.2 | 0 | 0 | 0 | 0.1 | 0 | 0 |
| 7 | Example | 75.7 | 18 | 6 | 0.20 | 0 | 0 | 0 | 0 | 0 | 0 | 0 | 0 | 0 |
| 8 | Example | 75.5 | 18 | 6 | 0.20 | 0 | 0 | 0.1 | 0 | 0 | 0 | 0.1 | 0 | 0 |
| 9 | Example | 75.5 | 18 | 6 | 0.20 | 0 | 0 | 0 | 0 | 0 | 0 | 0.2 | 0 | 0 |
| 10 | Example | 75.4 | 18 | 6 | 0.00 | 0 | 0 | 0 | 0 | 0 | 0 | 0.5 | 0 | 0 |
| 11 | Example | 74.87 | 18 | 6 | 0.03 | 0 | 0 | 0 | 0 | 0 | 0 | 1.0 | 0 | 0 |
| 12 | Example | 74.04 | 18 | 6 | 0.06 | 0 | 0 | 0.3 | 0 | 0 | 0 | 1.5 | 0 | 0 |
| 13 | Example | 75.81 | 18 | 6 | 0.09 | 0 | 0 | 0 | 0 | 0 | 0 | 0 | 0 | 0 |
| 14 | Example | 75.79 | 18 | 6 | 0.13 | 0 | 0 | 0 | 0 | 0 | 0 | 0 | 0 | 0 |
| 15 | Example | 75.75 | 18 | 6 | 0.15 | 0 | 0 | 0 | 0 | 0 | 0 | 0 | 0 | 0 |
| 16 | Example | 75.73 | 18 | 6 | 0.17 | 0 | 0 | 0 | 0 | 0 | 0 | 0 | 0 | 0 |
| 17 | Example | 85.74 | 10 | 4 | 0.19 | 0 | 0 | 0 | 0 | 0 | 0 | 0 | 0 | 0 |
| 18 | Example | 71.32 | 18 | 6 | 0.08 | 4.5 | 0 | 0 | 0 | 0 | 0 | 0 | 0 | 0 |
| 19 | Example | 74.32 | 18 | 6 | 0.08 | 0 | 1.5 | 0 | 0 | 0 | 0 | 0 | 0 | 0 |
| 20 | Example | 75.72 | 18 | 6 | 0.08 | 0 | 0 | 0.1 | 0 | 0 | 0 | 0 | 0 | 0 |
| 21 | Example | 75.32 | 18 | 6 | 0.08 | 0 | 0 | 0.5 | 0 | 0 | 0 | 0 | 0 | 0 |
| 22 | Example | 74.82 | 18 | 6 | 0.08 | 0 | 0 | 1 | 0 | 0 | 0 | 0 | 0 | 0 |
| 23 | Example | 72.82 | 18 | 6 | 0.08 | 0 | 0 | 3 | 0 | 0 | 0 | 0 | 0 | 0 |
| 24 | Example | 75.32 | 18 | 6 | 0.08 | 0 | 0 | 0 | 0.5 | 0 | 0 | 0 | 0 | 0 |
| 25 | Example | 75.42 | 18 | 6 | 0.08 | 0 | 0 | 0 | 0 | 0.4 | 0 | 0 | 0 | 0 |
| 26 | Example | 75.42 | 18 | 6 | 0.08 | 0 | 0 | 0 | 0 | 0 | 0.4 | 0 | 0 | 0 |
| 27 | Example | 73.52 | 18 | 6 | 0.08 | 0 | 0 | 0 | 0 | 0 | 0 | 2.3 | 0 | 0 |
| 28 | Example | 75.62 | 18 | 6 | 0.08 | 0 | 0 | 0 | 0 | 0 | 0 | 0 | 0.2 | 0 |
| 29 | Example | 75.62 | 18 | 6 | 0.08 | 0 | 0 | 0 | 0 | 0 | 0 | 0 | 0 | 0.2 |
| 30 | Example | 75.62 | 18 | 6 | 0.08 | 0 | 0 | 0 | 0 | 0 | 0 | 0 | 0 | 0 |
| 31 | Example | 75.62 | 18 | 6 | 0.08 | 0 | 0 | 0 | 0 | 0 | 0 | 0 | 0 | 0 |
| 32 | Example | 75.62 | 18 | 6 | 0.08 | 0 | 0 | 0 | 0 | 0 | 0 | 0 | 0 | 0 |
| 33 | Example | 75.62 | 18 | 6 | 0.08 | 0 | 0 | 0 | 0 | 0 | 0 | 0 | 0 | 0 |
| 34 | Example | 75.62 | 18 | 6 | 0.08 | 0 | 0 | 0 | 0 | 0 | 0 | 0 | 0 | 0 |
| 35 | Example | 75.62 | 18 | 6 | 0.08 | 0 | 0 | 0 | 0 | 0 | 0 | 0 | 0 | 0 |
| 36 | Example | 70.92 | 18 | 6 | 0.08 | 0 | 0 | 0 | 0 | 0 | 0 | 0 | 0 | 0 |
| 37 | Example | 75.42 | 18 | 6 | 0.08 | 0 | 0 | 0 | 0 | 0 | 0 | 0 | 0 | 0 |
| 38 | Example | 75.42 | 18 | 6 | 0.08 | 0 | 0 | 0 | 0 | 0 | 0 | 0 | 0 | 0 |
| 39 | Example | 75.42 | 18 | 6 | 0.08 | 0 | 0 | 0 | 0 | 0 | 0 | 0 | 0 | 0 |
| 40 | Example | 75.42 | 18 | 6 | 0.08 | 0 | 0 | 0 | 0 | 0 | 0 | 0 | 0 | 0 |
| 41 | Example | 75.82 | 18 | 6 | 0.08 | 0 | 0 | 0 | 0 | 0 | 0 | 0 | 0 | 0 |
| 42 | Example | 75.82 | 18 | 6 | 0.08 | 0 | 0 | 0 | 0 | 0 | 0 | 0 | 0 | 0 |
| 43 | Example | 75.82 | 18 | 6 | 0.08 | 0 | 0 | 0 | 0 | 0 | 0 | 0 | 0 | 0 |
| 44 | Example | 75.82 | 18 | 6 | 0.08 | 0 | 0 | 0 | 0 | 0 | 0 | 0 | 0 | 0 |

[Table 1-3]

TABLE 1-3

| No. | Category | Coating layer composition (mass %) | | | | | | | | | | |
|---|---|---|---|---|---|---|---|---|---|---|---|---|
| | | Ni | Co | V | Nb | Cu | Mn | Fe | Sr | Sb | Pb | B |
| 1 | Example | 0 | 0 | 0 | 0 | 0 | 0 | 0.1 | 0 | 0 | 0 | 0 |
| 2 | Example | 0 | 0 | 0 | 0 | 0 | 0 | 0.1 | 0 | 0 | 0 | 0 |
| 3 | Example | 0 | 0 | 0 | 0 | 0 | 0 | 0.1 | 0 | 0 | 0 | 0 |
| 4 | Example | 0 | 0.2 | 0 | 0 | 0 | 0 | 0.1 | 0 | 0 | 0 | 0 |
| 5 | Example | 0 | 0 | 0 | 0 | 0 | 0 | 0.1 | 0 | 0 | 0 | 0 |
| 6 | Example | 0 | 0 | 0 | 0 | 0 | 0 | 0.1 | 0 | 0 | 0 | 0 |
| 7 | Example | 0 | 0 | 0 | 0 | 0 | 0 | 0.1 | 0 | 0 | 0 | 0 |
| 8 | Example | 0 | 0 | 0 | 0 | 0 | 0 | 0.1 | 0 | 0 | 0 | 0 |
| 9 | Example | 0 | 0 | 0 | 0 | 0 | 0 | 0.1 | 0 | 0 | 0 | 0 |
| 10 | Example | 0 | 0 | 0 | 0 | 0 | 0 | 0.1 | 0 | 0 | 0 | 0 |
| 11 | Example | 0 | 0 | 0 | 0 | 0 | 0 | 0.1 | 0 | 0 | 0 | 0 |
| 12 | Example | 0 | 0 | 0 | 0 | 0 | 0 | 0.1 | 0 | 0 | 0 | 0 |
| 13 | Example | 0 | 0 | 0 | 0 | 0 | 0 | 0.1 | 0 | 0 | 0 | 0 |
| 14 | Example | 0 | 0 | 0 | 0 | 0 | 0 | 0.08 | 0 | 0 | 0 | 0 |
| 15 | Example | 0 | 0 | 0 | 0 | 0 | 0 | 0.1 | 0 | 0 | 0 | 0 |
| 16 | Example | 0 | 0 | 0 | 0 | 0 | 0 | 0.1 | 0 | 0 | 0 | 0 |
| 17 | Example | 0 | 0 | 0 | 0 | 0 | 0 | 0.07 | 0 | 0 | 0 | 0 |
| 18 | Example | 0 | 0 | 0 | 0 | 0 | 0 | 0.1 | 0 | 0 | 0 | 0 |
| 19 | Example | 0 | 0 | 0 | 0 | 0 | 0 | 0.1 | 0 | 0 | 0 | 0 |

TABLE 1-3-continued

| | | Coating layer composition (mass %) | | | | | | | | | | |
|---|---|---|---|---|---|---|---|---|---|---|---|---|
| No. | Category | Ni | Co | V | Nb | Cu | Mn | Fe | Sr | Sb | Pb | B |
| 20 | Example | 0 | 0 | 0 | 0 | 0 | 0 | 0.1 | 0 | 0 | 0 | 0 |
| 21 | Example | 0 | 0 | 0 | 0 | 0 | 0 | 0.1 | 0 | 0 | 0 | 0 |
| 22 | Example | 0 | 0 | 0 | 0 | 0 | 0 | 0.1 | 0 | 0 | 0 | 0 |
| 23 | Example | 0 | 0 | 0 | 0 | 0 | 0 | 0.1 | 0 | 0 | 0 | 0 |
| 24 | Example | 0 | 0 | 0 | 0 | 0 | 0 | 0.1 | 0 | 0 | 0 | 0 |
| 25 | Example | 0 | 0 | 0 | 0 | 0 | 0 | 0.1 | 0 | 0 | 0 | 0 |
| 26 | Example | 0 | 0 | 0 | 0 | 0 | 0 | 0.1 | 0 | 0 | 0 | 0 |
| 27 | Example | 0 | 0 | 0 | 0 | 0 | 0 | 0.1 | 0 | 0 | 0 | 0 |
| 28 | Example | 0 | 0 | 0 | 0 | 0 | 0 | 0.1 | 0 | 0 | 0 | 0 |
| 29 | Example | 0 | 0 | 0 | 0 | 0 | 0 | 0.1 | 0 | 0 | 0 | 0 |
| 30 | Example | 0.2 | 0 | 0 | 0 | 0 | 0 | 0.1 | 0 | 0 | 0 | 0 |
| 31 | Example | 0 | 0.2 | 0 | 0 | 0 | 0 | 0.1 | 0 | 0 | 0 | 0 |
| 32 | Example | 0 | 0 | 0.2 | 0 | 0 | 0 | 0.1 | 0 | 0 | 0 | 0 |
| 33 | Example | 0 | 0 | 0 | 0.2 | 0 | 0 | 0.1 | 0 | 0 | 0 | 0 |
| 34 | Example | 0 | 0 | 0 | 0 | 0.2 | 0 | 0.1 | 0 | 0 | 0 | 0 |
| 35 | Example | 0 | 0 | 0 | 0 | 0 | 0.2 | 0.1 | 0 | 0 | 0 | 0 |
| 36 | Example | 0 | 0 | 0 | 0 | 0 | 0 | 5 | 0 | 0 | 0 | 0 |
| 37 | Example | 0 | 0 | 0 | 0 | 0 | 0 | 0.1 | 0.4 | 0 | 0 | 0 |
| 38 | Example | 0 | 0 | 0 | 0 | 0 | 0 | 0.1 | 0 | 0.4 | 0 | 0 |
| 39 | Example | 0 | 0 | 0 | 0 | 0 | 0 | 0.1 | 0 | 0 | 0.4 | 0 |
| 40 | Example | 0 | 0 | 0 | 0 | 0 | 0 | 0.1 | 0 | 0 | 0 | 0.4 |
| 41 | Example | 0.4 (0) | 0 | 0 | 0 | 0 | 0 | 0.1 | 0 | 0 | 0 | 0 |
| 42 | Example | 15 (0) | 0 | 0 | 0 | 0 | 0 | 0.1 | 0 | 0 | 0 | 0 |
| 43 | Example | 1 (0) | 0 | 0 | 0 | 0 | 0 | 0.1 | 0 | 0 | 0 | 0 |
| 44 | Example | 4 (0) | 0 | 0 | 0 | 0 | 0 | 0.1 | 0 | 0 | 0 | 0 |

[Table 1-4]

TABLE 1-4

| No. | Category | Thickness of Al—Fe alloy layer (μm) | Area ratio of D-MgZn$_2$ (%) | Number of D-MgZn$_2$ (/25 cm$^2$) | corrosion resistance on flat surface | Sacrificial corrosion protection ability | Processability | Spangle appearance |
|---|---|---|---|---|---|---|---|---|
| 1 | Example | 1 | 32 | 6 | A+ | A+ | A− | A |
| 2 | Example | 1 | 72 | 88 | A | A | A | A+ |
| 3 | Example | 1 | 35 | 7 | A+ | A+ | A | A |
| 4 | Example | 1 | 76 | 92 | A+ | A | A− | A |
| 5 | Example | 1 | 50 | 25 | A+ | A | A | A+ |
| 6 | Example | 1 | 56 | 30 | A+ | A | A | A+ |
| 7 | Example | 1 | 43 | 22 | A+ | A+ | A | A+ |
| 8 | Example | 1 | 49 | 26 | A+ | A+ | A | A+ |
| 9 | Example | 1 | 53 | 3 | A+ | A+ | A | A+ |
| 10 | Example | 1 | 56 | 36 | A+ | A+ | A | A+ |
| 11 | Example | 1 | 62 | 40 | A+ | A+ | A | A+ |
| 12 | Example | 1 | 48 | 35 | A+ | A+ | A | A+ |
| 13 | Example | 1 | 46 | 39 | A+ | A+ | A | A+ |
| 14 | Example | 1 | 50 | 44 | A+ | A+ | A | A+ |
| 15 | Example | 1 | 55 | 40 | A+ | A+ | A | A+ |
| 16 | Example | 1 | 51 | 37 | A | A+ | A | A+ |
| 17 | Example | 1 | 33 | 19 | A | A+ | A | A |
| 18 | Example | 1 | 57 | 41 | A+ | A+ | A | A+ |
| 19 | Example | 1 | 47 | 36 | A+ | A+ | A | A+ |
| 20 | Example | 1 | 50 | 45 | A+ | A+ | A | A+ |
| 21 | Example | 1 | 53 | 47 | A+ | A+ | A | A+ |
| 22 | Example | 1 | 48 | 43 | A+ | A+ | A | A+ |
| 23 | Example | 1 | 46 | 46 | A | A+ | A− | A+ |
| 24 | Example | 1 | 52 | 50 | A+ | A+ | A | A+ |
| 25 | Example | 1 | 53 | 51 | A+ | A+ | A | A+ |
| 26 | Example | 1 | 47 | 54 | A+ | A+ | A | A+ |
| 27 | Example | 1 | 46 | 43 | A | A+ | A− | A+ |
| 28 | Example | 1 | 49 | 47 | A+ | A+ | A | A+ |
| 29 | Example | 1 | 52 | 50 | A+ | A+ | A | A+ |
| 30 | Example | 1 | 54 | 57 | A+ | A+ | A | A+ |
| 31 | Example | 1 | 50 | 52 | A+ | A+ | A | A+ |
| 32 | Example | 1 | 41 | 39 | A+ | A+ | A | A+ |
| 33 | Example | 1 | 46 | 47 | A+ | A+ | A | A+ |
| 34 | Example | 1 | 45 | 15 | A+ | A+ | A | A+ |
| 35 | Example | 1 | 48 | 40 | A+ | A+ | A | A+ |
| 36 | Example | 5 | 40 | 38 | A+ | A+ | A | A+ |
| 37 | Example | 1 | 52 | 46 | A+ | A+ | A | A+ |
| 38 | Example | 1 | 50 | 41 | A+ | A+ | A | A+ |
| 39 | Example | 1 | 53 | 47 | A+ | A+ | A | A+ |

TABLE 1-4-continued

| No. | Category | Thickness of Al—Fe alloy layer (μm) | Area ratio of D-MgZn$_2$ (%) | Number of D-MgZn$_2$ (/25 cm$^2$) | corrosion resistance on flat surface | Sacrificial corrosion protection ability | Processability | Spangle appearance |
|---|---|---|---|---|---|---|---|---|
| 40 | Example | 1 | 56 | 45 | A+ | A+ | A | A+ |
| 41 | Example | 1 | 49 | 40 | A | A+ | A | A+ |
| 42 | Example | 1 | 45 | 37 | A | A+ | A | A+ |
| 43 | Example | 1 | 53 | 46 | A | A+ | A | A+ |
| 44 | Example | 1 | 48 | 41 | A | A+ | A | A+ |

[Table 2-1]

TABLE 2-1

| No. | Category | Base steel Type | Relative surface area % | Coating bath melting point (° C.) | Coating bath temperature (° C.) | Immersion time (Seconds) | First stage average cooling rate (° C./s) | Second stage average cooling rate (° C./s) | Third stage average cooling rate (° C./s) |
|---|---|---|---|---|---|---|---|---|---|
| 45 | Comparative Example | — | 110 | 480 | 500 | 2 | 10 | 5 | 30 |
| 46 | Comparative Example | — | 123 | 400 | 420 | 2 | 10 | 5 | 30 |
| 47 | Comparative Example | — | 129 | 470 | 490 | 2 | 10 | 5 | 30 |
| 48 | Comparative Example | — | 141 | 450 | 470 | 2 | 10 | 5 | 30 |
| 49 | Comparative Example | — | 130 | 470 | 490 | 2 | 10 | 5 | 30 |
| 50 | Comparative Example | — | 104 | 460 | 480 | 2 | 10 | 5 | 30 |
| 51 | Comparative Example | — | 109 | 460 | 480 | 2 | 10 | 5 | 30 |
| 52 | Comparative Example | — | 127 | 460 | 480 | 2 | 10 | 5 | 30 |
| 53 | Comparative Example | — | 136 | 460 | 480 | 2 | 10 | 5 | 30 |
| 54 | Comparative Example | — | 143 | 460 | 480 | 2 | 10 | 5 | 30 |
| 55 | Comparative Example | — | 110 | 460 | 480 | 2 | 10 | 5 | 30 |
| 56 | Comparative Example | — | 116 | 460 | 480 | 2 | 10 | 5 | 30 |
| 57 | Comparative Example | — | 118 | 470 | 490 | 2 | 10 | 5 | 30 |
| 58 | Comparative Example | — | 140 | 460 | 480 | 2 | 10 | 5 | 30 |
| 59 | Comparative Example | — | 143 | 460 | 480 | 2 | 10 | 5 | 30 |
| 60 | Comparative Example | — | 135 | 460 | 480 | 2 | 10 | 5 | 30 |
| 61 | Comparative Example | — | 128 | 460 | 480 | 2 | 10 | 5 | 30 |
| 62 | Comparative Example | — | 127 | 460 | 480 | 2 | 10 | 5 | 30 |
| 63 | Comparative Example | — | 137 | 460 | 480 | 2 | 10 | 5 | 30 |
| 64 | Comparative Example | — | 129 | 460 | 480 | 2 | 10 | 5 | 30 |
| 65 | Comparative Example | — | 108 | 460 | 480 | 2 | 10 | 5 | 30 |
| 66 | Comparative Example | — | 115 | 460 | 570 | 2 | 10 | 5 | 30 |
| 67 | Comparative Example | — | 126 | 460 | 480 | 2 | 10 | 5 | 30 |
| 68 | Comparative Example | — | 128 | 460 | 480 | 2 | 10 | 5 | 30 |
| 69 | Comparative Example | — | 120 | 460 | 480 | 2 | 10 | 5 | 30 |
| 70 | Comparative Example | — | 130 | 460 | 480 | 2 | 10 | 5 | 30 |
| 71 | Comparative Example | — | 141 | 460 | 480 | 2 | 10 | 12 | 30 |
| 72 | Comparative Example | — | 143 | 460 | 480 | 2 | 3 | 5 | 30 |
| 73 | Comparative Example | — | 120 | 460 | 480 | 2 | 10 | 5 | 10 |
| 74 | Comparative Example | — | 111 | 460 | 480 | 2 | 5 | 5 | 5 |
| 75 | Comparative Example | — | 175 | 460 | 480 | 2 | 10 | 5 | 30 |

[Table 2-2]

TABLE 2-2

| No. | Category | Coating layer composition (mass %) | | | | | | | | | | | | |
|---|---|---|---|---|---|---|---|---|---|---|---|---|---|---|
| | | Zn | Al | Mg | Sn | B | In | Ca | Y | La | Ce | Si | Cr | Ti |
| 45 | Comparative Example | 63.7 | 24 | 12 | 0.20 | 0 | 0 | 0 | 0 | 0 | 0 | 0 | 0 | 0 |
| 46 | Comparative Example | 90.82 | 4.5 | 4 | 0.08 | 0 | 0 | 0 | 0 | 0 | 0 | 0.5 | 0 | 0 |
| 47 | Comparative Example | 67.82 | 26 | 6 | 0.08 | 0 | 0 | 0 | 0 | 0 | 0 | 0 | 0 | 0 |
| 48 | Comparative Example | 78.82 | 18 | 3 | 0.08 | 0 | 0 | 0 | 0 | 0 | 0 | 0 | 0 | 0 |
| 49 | Comparative Example | 68.82 | 18 | 13 | 0.08 | 0 | 0 | 0 | 0 | 0 | 0 | 0 | 0 | 0 |
| 50 | Comparative Example | 72.8 | 18 | 6 | 3.10 | 0 | 0 | 0 | 0 | 0 | 0 | 0 | 0 | 0 |
| 51 | Comparative Example | 70.82 | 18 | 6 | 0.08 | 5.0 | 0 | 0 | 0 | 0 | 0 | 0 | 0 | 0 |
| 52 | Comparative Example | 73.82 | 18 | 6 | 0.08 | 0 | 2.0 | 0 | 0 | 0 | 0 | 0 | 0 | 0 |
| 53 | Comparative Example | 72.32 | 18 | 6 | 0.08 | 0 | 0 | 3.5 | 0 | 0 | 0 | 0 | 0 | 0 |
| 54 | Comparative Example | 75.22 | 18 | 6 | 0.08 | 0 | 0 | 0 | 0.6 | 0 | 0 | 0 | 0 | 0 |
| 55 | Comparative Example | 75.22 | 18 | 6 | 0.08 | 0 | 0 | 0 | 0 | 0.6 | 0 | 0 | 0 | 0 |
| 56 | Comparative Example | 75.22 | 18 | 6 | 0.08 | 0 | 0 | 0 | 0 | 0 | 0.6 | 0 | 0 | 0 |
| 57 | Comparative Example | 73.12 | 18 | 6 | 0.08 | 0 | 0 | 0 | 0 | 0 | 0 | 2.7 | 0 | 0 |

TABLE 2-2-continued

| | | Coating layer composition (mass %) | | | | | | | | | | | | |
|---|---|---|---|---|---|---|---|---|---|---|---|---|---|---|
| No. | Category | Zn | Al | Mg | Sn | B | In | Ca | Y | La | Ce | Si | Cr | Ti |
| 58 | Comparative Example | 75.52 | 18 | 6 | 0.08 | 0 | 0 | 0 | 0 | 0 | 0 | 0 | 0.3 | 0 |
| 59 | Comparative Example | 75.52 | 18 | 6 | 0.08 | 0 | 0 | 0 | 0 | 0 | 0 | 0 | 0 | 0.3 |
| 60 | Comparative Example | 75.52 | 18 | 6 | 0.08 | 0 | 0 | 0 | 0 | 0 | 0 | 0 | 0 | 0 |
| 61 | Comparative Example | 75.52 | 18 | 6 | 0.08 | 0 | 0 | 0 | 0 | 0 | 0 | 0 | 0 | 0 |
| 62 | Comparative Example | 75.52 | 18 | 6 | 0.08 | 0 | 0 | 0 | 0 | 0 | 0 | 0 | 0 | 0 |
| 63 | Comparative Example | 75.52 | 18 | 6 | 0.08 | 0 | 0 | 0 | 0 | 0 | 0 | 0 | 0 | 0 |
| 64 | Comparative Example | 75.52 | 18 | 6 | 0.08 | 0 | 0 | 0 | 0 | 0 | 0 | 0 | 0 | 0 |
| 65 | Comparative Example | 75.52 | 18 | 6 | 0.08 | 0 | 0 | 0 | 0 | 0 | 0 | 0 | 0 | 0 |
| 66 | Comparative Example | 68.92 | 18 | 6 | 0.08 | 0 | 0 | 0 | 0 | 0 | 0 | 0 | 0 | 0 |
| 67 | Comparative Example | 75.32 | 18 | 6 | 0.08 | 0 | 0 | 0 | 0 | 0 | 0 | 0 | 0 | 0 |
| 68 | Comparative Example | 75.32 | 18 | 6 | 0.08 | 0 | 0 | 0 | 0 | 0 | 0 | 0 | 0 | 0 |
| 69 | Comparative Example | 75.32 | 18 | 6 | 0.08 | 0 | 0 | 0 | 0 | 0 | 0 | 0 | 0 | 0 |
| 70 | Comparative Example | 75.22 | 18 | 6 | 0.08 | 0 | 0 | 0 | 0 | 0 | 0 | 0 | 0 | 0 |
| 71 | Comparative Example | 75.82 | 18 | 6 | 0.08 | 0 | 0 | 0 | 0 | 0 | 0 | 0 | 0 | 0 |
| 72 | Comparative Example | 75.82 | 18 | 6 | 0.08 | 0 | 0 | 0 | 0 | 0 | 0 | 0 | 0 | 0 |
| 73 | Comparative Example | 75.82 | 18 | 6 | 0.08 | 0 | 0 | 0 | 0 | 0 | 0 | 0 | 0 | 0 |
| 74 | Comparative Example | 75.82 | 18 | 6 | 0.08 | 0 | 0 | 0 | 0 | 0 | 0 | 0 | 0 | 0 |
| 75 | Comparative Example | 75.82 | 18 | 6 | 0.08 | 0 | 0 | 0 | 0 | 0 | 0 | 0 | 0 | 0 |

[Table 2-3]

TABLE 2-3

| | | Coating layer composition (mass %) | | | | | | | | | | |
|---|---|---|---|---|---|---|---|---|---|---|---|---|
| No. | Category | Ni | Co | V | Nb | Cu | Mn | Fe | Sr | Sb | Pb | B |
| 45 | Comparative Example | 0 | 0 | 0 | 0 | 0 | 0 | 0.1 | 0 | 0 | 0 | 0 |
| 46 | Comparative Example | 0 | 0 | 0 | 0 | 0 | 0 | 0.1 | 0 | 0 | 0 | 0 |
| 47 | Comparative Example | 0 | 0 | 0 | 0 | 0 | 0 | 0.1 | 0 | 0 | 0 | 0 |
| 48 | Comparative Example | 0 | 0 | 0 | 0 | 0 | 0 | 0.1 | 0 | 0 | 0 | 0 |
| 49 | Comparative Example | 0 | 0 | 0 | 0 | 0 | 0 | 0.1 | 0 | 0 | 0 | 0 |
| 50 | Comparative Example | 0 | 0 | 0 | 0 | 0 | 0 | 0.1 | 0 | 0 | 0 | 0 |
| 51 | Comparative Example | 0 | 0 | 0 | 0 | 0 | 0 | 0.1 | 0 | 0 | 0 | 0 |
| 52 | Comparative Example | 0 | 0 | 0 | 0 | 0 | 0 | 0.1 | 0 | 0 | 0 | 0 |
| 53 | Comparative Example | 0 | 0 | 0 | 0 | 0 | 0 | 0.1 | 0 | 0 | 0 | 0 |
| 54 | Comparative Example | 0 | 0 | 0 | 0 | 0 | 0 | 0.1 | 0 | 0 | 0 | 0 |
| 55 | Comparative Example | 0 | 0 | 0 | 0 | 0 | 0 | 0.1 | 0 | 0 | 0 | 0 |
| 56 | Comparative Example | 0 | 0 | 0 | 0 | 0 | 0 | 0.1 | 0 | 0 | 0 | 0 |
| 57 | Comparative Example | 0 | 0 | 0 | 0 | 0 | 0 | 0.1 | 0 | 0 | 0 | 0 |
| 58 | Comparative Example | 0 | 0 | 0 | 0 | 0 | 0 | 0.1 | 0 | 0 | 0 | 0 |
| 59 | Comparative Example | 0 | 0 | 0 | 0 | 0 | 0 | 0.1 | 0 | 0 | 0 | 0 |
| 60 | Comparative Example | 0.3 | 0 | 0 | 0 | 0 | 0 | 0.1 | 0 | 0 | 0 | 0 |
| 61 | Comparative Example | 0 | 0.3 | 0 | 0 | 0 | 0 | 0.1 | 0 | 0 | 0 | 0 |
| 62 | Comparative Example | 0 | 0 | 0.3 | 0 | 0 | 0 | 0.1 | 0 | 0 | 0 | 0 |
| 63 | Comparative Example | 0 | 0 | 0 | 0.3 | 0 | 0 | 0.1 | 0 | 0 | 0 | 0 |
| 64 | Comparative Example | 0 | 0 | 0 | 0 | 0.3 | 0 | 0.1 | 0 | 0 | 0 | 0 |
| 65 | Comparative Example | 0 | 0 | 0 | 0 | 0 | 0.3 | 0.1 | 0 | 0 | 0 | 0 |
| 66 | Comparative Example | 0 | 0 | 0 | 0 | 0 | 0 | 7.0 | 0 | 0 | 0 | 0 |
| 67 | Comparative Example | 0 | 0 | 0 | 0 | 0 | 0 | 0 | 0.6 | 0 | 0 | 0 |
| 68 | Comparative Example | 0 | 0 | 0 | 0 | 0 | 0 | 0 | 0 | 0.6 | 0 | 0 |
| 69 | Comparative Example | 0 | 0 | 0 | 0 | 0 | 0 | 0 | 0 | 0 | 0.6 | 0 |
| 70 | Comparative Example | 0 | 0 | 0 | 0 | 0 | 0 | 0.1 | 0 | 0 | 0 | 0.6 |
| 71 | Comparative Example | 0 | 0 | 0 | 0 | 0 | 0 | 0.1 | 0 | 0 | 0 | 0 |
| 72 | Comparative Example | 0 | 0 | 0 | 0 | 0 | 0 | 0.1 | 0 | 0 | 0 | 0 |
| 73 | Comparative Example | 0 | 0 | 0 | 0 | 0 | 0 | 0.1 | 0 | 0 | 0 | 0 |
| 74 | Comparative Example | 0 | 0 | 0 | 0 | 0 | 0 | 0.1 | 0 | 0 | 0 | 0 |
| 75 | Comparative Example | 0 | 0 | 0 | 0 | 0 | 0 | 0.1 | 0 | 0 | 0 | 0 |

[Table 2-4]

TABLE 2-4

| No. | Category | Thickness of Al—Fe alloy layer (μm) | Area ratio of D-MgZn$_2$ (%) | Number of D-MgZn$_2$ (/25 cm$^2$) | corrosion resistance on flat surface | Sacrificial corrosion protection ability | Processability | Spangle |
|---|---|---|---|---|---|---|---|---|
| 45 | Comparative Example | 1 | 83 | 108 | A | NG | A | NG+ |
| 46 | Comparative Example | 1 | 5 | 2 | NG | A+ | A | NG |
| 47 | Comparative Example | 1 | 84 | 103 | A | NG | A | NG+ |

TABLE 2-4-continued

| No. | Category | Thickness of Al—Fe alloy layer (μm) | Area ratio of D-MgZn$_2$ (%) | Number of D-MgZn$_2$ (/25 cm$^2$) | corrosion resistance on flat surface | Sacrificial corrosion protection ability | Processability | Spangle |
|---|---|---|---|---|---|---|---|---|
| 48 | Comparative Example | 1 | 15 | 4 | NG | A+ | A | NG |
| 49 | Comparative Example | 1 | 75 | 96 | A+ | A+ | NG | A |
| 50 | Comparative Example | 1 | 46 | 50 | NG | A+ | A | A+ |
| 51 | Comparative Example | 1 | 40 | 40 | NG | A+ | A | A+ |
| 52 | Comparative Example | 1 | 48 | 47 | NG | A+ | A | A+ |
| 53 | Comparative Example | 1 | 50 | 56 | NG | A+ | NG | A+ |
| 54 | Comparative Example | 1 | 41 | 49 | NG | A+ | A | A+ |
| 55 | Comparative Example | 1 | 47 | 47 | NG | A+ | A | A+ |
| 56 | Comparative Example | 1 | 53 | 51 | NG | A+ | A | A+ |
| 57 | Comparative Example | 1 | 50 | 45 | NG | A+ | NG | A+ |
| 58 | Comparative Example | 1 | 39 | 40 | NG | A+ | A | A+ |
| 59 | Comparative Example | 1 | 44 | 40 | NG | A+ | A | A+ |
| 60 | Comparative Example | 1 | 48 | 47 | NG | A+ | A | A+ |
| 61 | Comparative Example | 1 | 51 | 56 | NG | A+ | A | A+ |
| 62 | Comparative Example | 1 | 14 | 46 | NG | A+ | A | A+ |
| 63 | Comparative Example | 1 | 49 | 48 | NG | A+ | A | A+ |
| 64 | Comparative Example | 1 | 47 | 49 | NG | A+ | A | A+ |
| 65 | Comparative Example | 1 | 52 | 50 | NG | A+ | A | A+ |
| 66 | Comparative Example | 8 | 35 | 30 | A | A+ | NG | A+ |
| 67 | Comparative Example | 1 | 58 | 51 | NG | A+ | A | A+ |
| 68 | Comparative Example | 1 | 56 | 57 | NG | A+ | A | A+ |
| 69 | Comparative Example | 1 | 51 | 48 | NG | A+ | A | A+ |
| 70 | Comparative Example | 1 | 47 | 42 | NG | A+ | A | A+ |
| 71 | Comparative Example | 1 | 21 | 10 | NG | A+ | A | NG |
| 72 | Comparative Example | 2 | 0 | 0 | A+ | A+ | NG | NG |
| 73 | Comparative Example | 2 | 0 | 0 | A+ | A+ | NG | NG |
| 74 | Comparative Example | 2 | 2 | 4 | A+ | A+ | NG | NG |
| 75 | Comparative Example | 1 | 31 | 3 | A+ | A+ | A | NG+ |

As seen from the above-described results, the Examples corresponding to the coated steel product of the disclosure have stable corrosion resistance on flat surface and sacrificial corrosion protection ability while having a beautiful spangle appearance as compared to the Comparative Examples.

In particular, with respect to a Comparative Example (Test No. 72) in which the primary cooling was performed at an average cooling rate that did not satisfy Inequality (1): A≥1.5×B even though the requirements concerning the chemical composition of the coating layer of the disclosure was satisfied, it is obvious that the surface quality of the coating layer was deteriorated by mist cooling, and thus the spangle pattern is hardly visible.

With respect to a Comparative Example (Test No. 71) in which the secondary cooling was performed at an average cooling rate that did not satisfy Inequality (2): B≤9° C./s even though the requirements concerning the chemical composition of the coating layer of the disclosure was satisfied, it is obvious that the growth of the dendrite-shaped MgZn$_2$ phase was insufficient, and thus the spangle pattern is hardly visible.

With respect to a Comparative Example (Test No. 73) in which the tertiary cooling was performed at an average cooling rate that did not satisfy Inequality (3): C≥4×B even though the requirements concerning the chemical composition of the coating layer of the disclosure was satisfied, it is obvious that the coating appearance was poor due to the coating layer being wound around the top roll, and thus the spangle pattern is hardly visible.

With respect to a Comparative Example (Test No. 74) in which the primary cooling was performed at an average cooling rate that did not satisfy Inequality (1): A≥1.5×B and the tertiary cooling was performed at an average cooling rate that did not satisfy Inequality (3): C≥4×B even though the requirements concerning the chemical composition of the coating layer of the disclosure was satisfied, it is obvious that the surface quality of the coating layer was deteriorated by mist cooling, and thus the spangle pattern is hardly visible.

With respect to a Comparative Example (Test No. 75) in which the coating layer was formed without brush-grinding the surface to be coated of the base steel even though the requirements concerning the chemical composition of the coating layer of the disclosure was satisfied, it is obvious that the growth of the dendrite-shaped MgZn$_2$ phase was insufficient, and thus the spangle pattern is hardly visible.

Since the Ni concentrations of the coating layers of the examples (Test Nos. 41 to 44) using the Ni pre-coated steel sheet are from 0.28% to 15%, these correspond to examples in which the Ni concentration of the coating layer is regarded as 0%.

Preferred embodiments of the disclosure have been described in detail with reference to the accompanying drawings. However, the disclosure is not limited to such examples. It is obvious that those having ordinary skill in the art to which the disclosure belongs can conceive various changes or modifications within the scope of the technical concepts described in the claims, and it should be understood that these changes or modifications also fall within the technical scope of the disclosure.

The entire disclosure of Japanese Patent Application No. 2020-176669 is incorporated herein by reference.

All the documents, patent applications, and technical standards cited in this specification are incorporated herein by reference to the same extent as when each individual document, patent application, or technical standard is specifically and individually indicated to be incorporated by reference.

The invention claimed is:

1. A coated steel product comprising a base steel, and a coating layer containing a Zn—Al—Mg alloy layer disposed on a surface of the base steel,
wherein the coating layer has a chemical composition containing, in % by mass:
Zn: greater than 65.0%,
Al: from greater than 5.0% to less than 25.0%,
Mg: from greater than 3.0% to less than 12.5%,
Sn: from 0% to 3.00%,
Bi: from 0% to less than 5.0%,
In: from 0% to less than 2.0%,
Ca: from 0% to 3.0%,
Y: from 0% to 0.5%,
La: from 0% to less than 0.5%,
Ce: from 0% to less than 0.5%,
Si: from 0% to less than 2.5%,
Cr: from 0% to 0.25%,
Ti: from 0% to 0.25%,
Ni: from 0% to 0.25%,
Co: from 0% to 0.25%,
V: from 0% to 0.25%,
Nb: from 0% to 0.25%,
Cu: from 0% to 0.25%,
Mn: from 0% to 0.25%,
Fe: from 0% to 5.0%,
Sr: from 0% to less than 0.5%,
Sb: from 0% to less than 0.5%,
Pb: from 0% to less than 0.5%,
B: from 0% to less than 0.5%, and
impurities,
the coated steel product including dendrite-shaped $MgZn_2$ phase having a surface roughness Sa of 50 nm or less on a surface of the Zn—Al—Mg alloy layer,
an area ratio of the dendrite-shaped $MgZn_2$ phase having a surface roughness Sa of 50 nm or less being from 30% to 80% within a region of an observable field of view of 5 $mm^2$, and
among the dendrite-shaped $MgZn_2$ phase having a surface roughness Sa of 50 nm or less, a number of dendrite-shaped $MgZn_2$ phase having an area of 0.1 $mm^2$ or more being from 5 to 100 within a region of an observable field of view of 25 $mm^2$.

2. The coated steel product according to claim 1, wherein a content of Sn in the coating layer is from 0.05% to 3.00%, by mass %.

* * * * *